United States Patent
Whitehead

(10) Patent No.: US 10,349,106 B1
(45) Date of Patent: Jul. 9, 2019

(54) SYSTEMS AND METHODS FOR PROVIDING TARGETED VIDEO CONTENT

(71) Applicant: Verizon Patent and Licensing Inc., Arlington, VA (US)

(72) Inventor: Steven D. Whitehead, Hudson, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/878,262

(22) Filed: Jan. 23, 2018

Related U.S. Application Data

(63) Continuation of application No. 11/771,256, filed on Jun. 29, 2007, now abandoned.

(Continued)

(51) Int. Cl.
| | |
|---|---|
| *H04N 21/222* | (2011.01) |
| *H04N 21/234* | (2011.01) |
| *H04N 21/25* | (2011.01) |
| *H04N 21/2668* | (2011.01) |
| *H04N 21/231* | (2011.01) |
| *H04N 21/258* | (2011.01) |

(Continued)

(52) U.S. Cl.
CPC ... *H04N 21/2668* (2013.01); *H04N 21/23106* (2013.01); *H04N 21/25808* (2013.01); *H04N 21/25883* (2013.01); *H04N 21/42684* (2013.01); *H04N 21/454* (2013.01); *H04N 21/6125* (2013.01)

(58) Field of Classification Search
CPC ......... H04N 21/2225; H04N 21/23424; H04N 21/251; H04N 21/258; H04N 21/25883

USPC ......................................... 725/32–36, 86, 87
See application file for complete search history.

(56) References Cited

U.S. PATENT DOCUMENTS

| | | |
|---|---|---|
| 5,974,398 A | 10/1999 | Hanson et al. |
| 6,014,698 A | 1/2000 | Griffiths |

(Continued)

FOREIGN PATENT DOCUMENTS

| | | |
|---|---|---|
| WO | 1998/031114 | 7/1998 |

OTHER PUBLICATIONS

"DNS—Webopedia Definition and Links," http://web.archive.org/web/20000510110314/http://www.webopedia.com/TE . . . Jun. 4, 2011, 3 pages, Copyright 1999-2000 internet.com Corp., May 10, 2000.

*Primary Examiner* — Dominic D Saltarelli

(57) ABSTRACT

A system may include a user interface module, a video services module, and a targeting module. The targeting module may be configured to receive addressability information from the video services module, receive receptiveness information from the video services module, apply filtering information to the receptiveness information, associate filtered receptiveness information with an end user using at least one of an IP address associated with the user interface module or a video services user identifier, perform an aging operation on the filtered receptiveness information, determine whether the end user is part of a target audience, determine an item of targeted content to provide to the end user, and transmit the selected item of the targeted content. The user interface module may be configured to detect signals embedded in an item of video-on-demand content and insert the targeted content from the local cache into a video stream.

20 Claims, 10 Drawing Sheets

Related U.S. Application Data

(60) Provisional application No. 60/917,553, filed on May 11, 2007.

(51) Int. Cl.
  *H04N 21/61* (2011.01)
  *H04N 21/454* (2011.01)
  *H04N 21/426* (2011.01)

(56) References Cited

U.S. PATENT DOCUMENTS

| | | | |
|---|---|---|---|
| 6,029,045 A | 2/2000 | Picco et al. | |
| 6,301,667 B1 | 10/2001 | Digiacomo et al. | |
| 6,850,252 B1 | 2/2005 | Hoffberg | |
| 7,010,495 B1 | 3/2006 | Samra et al. | |
| 7,146,627 B1 | 12/2006 | Ismail et al. | |
| 7,620,162 B2 | 11/2009 | Aaron et al. | |
| 7,680,875 B1 | 3/2010 | Shopiro et al. | |
| 2001/0000193 A1 | 4/2001 | Boden et al. | |
| 2001/0052007 A1 | 12/2001 | Shigezumi | |
| 2002/0004836 A1 | 1/2002 | Shah | |
| 2002/0016789 A1 | 2/2002 | Ong | |
| 2002/0040394 A1 | 4/2002 | Shapira | |
| 2002/0059094 A1 | 5/2002 | Hosea et al. | |
| 2002/0072965 A1 | 6/2002 | Merriman et al. | |
| 2002/0135801 A1 | 9/2002 | Tessman et al. | |
| 2003/0074471 A1 | 4/2003 | Anderson et al. | |
| 2003/0110252 A1 | 6/2003 | Yang-Huffman | |
| 2003/0149975 A1* | 8/2003 | Eldering | H04N 7/17318 725/34 |
| 2003/0171978 A1 | 9/2003 | Jenkins et al. | |
| 2003/0172145 A1 | 9/2003 | Nguyen | |
| 2003/0212800 A1 | 11/2003 | Jones et al. | |
| 2003/0229892 A1 | 12/2003 | Sardera | |
| 2004/0128534 A1 | 7/2004 | Walker | |
| 2004/0246948 A1 | 12/2004 | Lee et al. | |
| 2004/0247092 A1 | 12/2004 | Timmins et al. | |
| 2004/0267751 A1 | 12/2004 | Dill et al. | |
| 2005/0086299 A1 | 4/2005 | Ansell et al. | |
| 2007/0038516 A1 | 2/2007 | Apple et al. | |
| 2007/0061331 A1 | 3/2007 | Ramer et al. | |
| 2007/0078709 A1 | 4/2007 | Rajaram | |
| 2007/0157228 A1 | 7/2007 | Bayer et al. | |
| 2007/0198339 A1 | 8/2007 | Shen et al. | |
| 2007/0204310 A1 | 8/2007 | Hua et al. | |
| 2007/0239529 A1 | 10/2007 | Baluja et al. | |
| 2008/0016556 A1 | 1/2008 | Selignan | |
| 2009/0172171 A1 | 7/2009 | Amir | |

\* cited by examiner

SYSTEMS AND METHODS FOR PROVIDING TARGETED VIDEO CONTENT

This application is a continuation of U.S. patent application Ser. No. 11/771,256, filed Jun. 29, 2007, which claims priority to U.S. Provisional Application No. 60/917,553, filed May 11, 2007, the contents of which are incorporated herein by reference. The contents of the following applications, are also incorporated by reference in their entirety: U.S. Non-Provisional patent application Ser. No. 11/771,218 filed Jun. 29, 2007, U.S. Non-Provisional patent application Ser. No. 11/771,351, filed Jun. 29, 2007, U.S. Non-Provisional patent application Ser. No. 11/771,207, filed Jun. 29, 2007, and U.S. Non-Provisional patent application Ser. No. 11/771,292, filed Jun. 29, 2007.

BACKGROUND INFORMATION

Targeted marketing aims to simultaneously reduce the cost of and improve the response to marketing campaigns by delivering marketing content to recipients who are most likely to be receptive to that content. Cost is reduced by limiting the distribution of the content; response is improved by delivering the content to those recipients most likely to respond.

Common examples of targeted marketing include the following: direct-mail marketing, such as mail order catalog distribution, wherein marketing content is mailed to households whose members belong to a relevant affinity group; newsletter distribution to those individuals who have expressed an explicit interest in receiving the newsletter; advertising inserted into the response pages of online search engines, such as Google™ and Yahoo™ search, wherein the recipients are selected based on the keywords they enter on the search page; and context-based advertisement insertion, such as banner advertisements placed on a website, wherein the website is selected based on knowledge, or implicit assumption, that individuals in a target group are more likely to visit that website than other websites.

Entities that employ targeted marketing face two challenges: 1) cost-effectiveness in identifying the individuals or groups most likely to be differentially more receptive to the marketing content; and 2) identifying the location where the marketing content should be sent to reach those individuals or groups. Responding to those challenges requires the acquisition and processing of information associated with receptiveness and addressability.

The convergence of communications, information, and entertainment services industries has led to the emergence of service providers that provide multiple services, including Internet access, voice services, and video entertainment services among others. Moreover, these service providers are delivering the services over a converged services infrastructure, which, at its core, is based on Internet Protocol (IP) networking technologies. This extensive services infrastructure consists of systems, information and processes needed to deliver a wide range of information, entertainment and communications services to millions of users. This infrastructure also represents a potentially valuable set of resources on which to build and operate a wide range of powerful marketing services.

BRIEF DESCRIPTION OF THE DRAWINGS

In order to facilitate a fuller understanding of the exemplary embodiments, reference is now made to the appended drawings, in which like reference characters are used to indicate like elements. These drawings should not be construed as limiting, but are intended to be exemplary only.

DETAILED DESCRIPTION OF PREFERRED EMBODIMENTS

Figure 1:
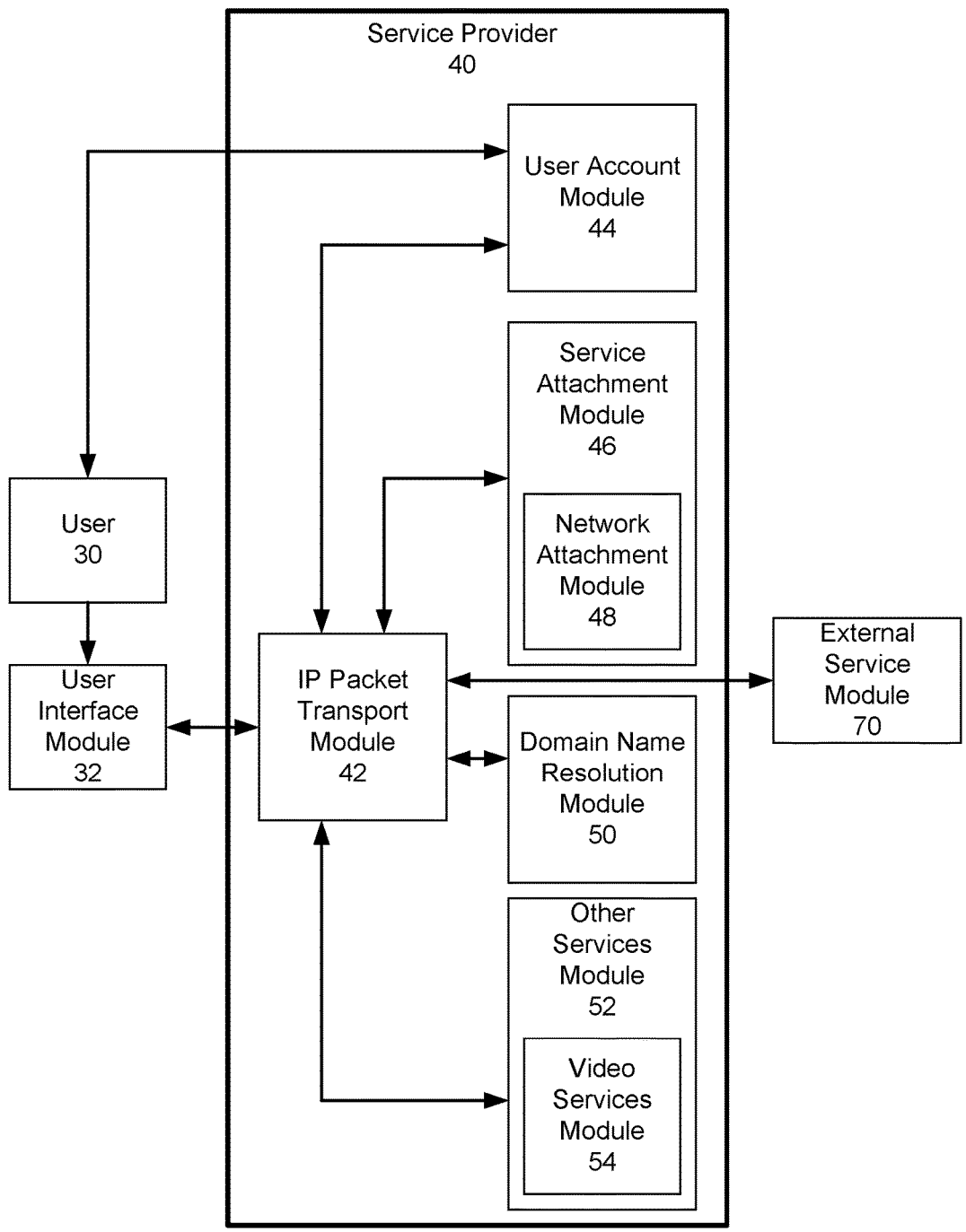
FIG. 1 is a schematic diagram of a system for delivering IP-based services, according to an exemplary embodiment.

The following description is intended to convey a thorough understanding of the embodiments described by providing a number of specific embodiments and details involving using video services records to identify user interests, and using those user interests to send marketing content to the user. It should be appreciated, however, that these specific embodiments and details are exemplary only.

As used herein, the term "marketing content" is interpreted broadly to include any type of information that a service provider or a third party may elect to send to a user. Thus, marketing content can include, but is not limited to, offers for goods or services, requests for charitable donations, requests for information, general information not associated with an offer or request, etc.

As used herein, the term "targeted marketing services (TMS)" is interpreted broadly to include marketing activity whereby steps are taken to deliver marketing content to a particular group of individuals, the members of which are believed to be more receptive to the content than other individuals.

As used herein, the term "user" is interpreted broadly to include any individual or collection of individuals using at least one service provided by a service provider. A user includes, but is not limited to, an individual, a household that interacts with a service provider using a single set of identifying data, a business entity that interacts with a service provider using a single set of identifying data, etc.

As used herein, the term "IP-enabled device" is interpreted broadly to include any device capable of communicating with other devices across an IP-based network. IP-enabled devices include, but are not limited to, personal computers (PCs), personal digital assistants (PDAs), smart phones, cellular telephones, set-top boxes, etc.

The description below describes models at an introductory and abstract level of the systems and methods used by service providers to deliver IP-based services. These systems and methods are well-known in the art. The models are intended only to provide sufficient background for a thorough understanding of the embodiments described.

The description below describes modules that may include one or more servers, databases, subsystems and other components. As used herein, the term "module" may be understood to refer to software, firmware, hardware, and/or various combinations thereof. The modules are exemplary. The modules may be combined, integrated, separated, and/or duplicated to support various applications and may be centralized or distributed. A function described herein as being performed at a particular module may be performed at one or more other modules and/or by one or more other devices instead of or in addition to the function performed at the particular module. The modules may be implemented across multiple devices and/or other components local or remote to one another. The devices and components that comprise one module may or may not be distinct from the devices and components that comprise other modules.

The technology infrastructure used by service providers to deliver IP-based services can be extensive. The technology can consist of the systems, information and processes needed to deliver a wide range of information, entertainment and communications services to millions of users.

From a marketing services perspective, this infrastructure also can represent a potentially valuable set of resources on which to build and operate a wide range of powerful marketing services. Service provider infrastructure resources, in existing or slightly modified form, can be used for at least two important purposes in a marketing services context: 1) as a source of marketing information, including both receptiveness information, which relates to a user's receptiveness to particular marketing content, and addressability information, which relates to a user's physical or virtual location for sending marketing content; and 2) as a distribution channel for sending marketing content to the user.

The IP-based services provided by service providers can include IP access service. IP access service can allow a user to obtain access to one or more public and/or private IP networks, including but not limited to, the Internet. As part of this service, the user can couple an IP-enabled device to the service provider's access infrastructure. The service provider can provide transport service through at least one of its networks and/or interconnection services to other networks as needed to deliver packets across other IP networks. This IP access service can be the basis for a wide range of IP-based applications and services, including, but not limited to, web browsing, file sharing, multimedia streaming, electronic messaging, etc.

The IP-based services provided by service providers can include IP-based video services. These services, using IP-based technology, can allow users to view and/or experience video and/or other multimedia content, e.g., movies, music, etc., through the use of an IP-enabled device. Video services can be delivered in near-real-time via a variety of streaming and/or progressive download technologies. Video services can be delivered via bulk download in advance for subsequent viewing at a later time. Video services can be interactive. Video services can include, for example, IP-based broadcast, multicast or unicast video distribution. IP-based broadcast service can allow users to watch video content from a line-up of multiple channels, each of which contains a continuous feed of scheduled programming. IP-based video-on-demand (VOD) can allow users to select, from a library of choices, video content to view on demand. Video services can involve IP packet transport across at least one public IP network, at least one private IP network or a combination thereof.

Referring to FIG. 1, a schematic diagram of a system for delivering IP-based services, according to an exemplary embodiment, is illustrated. System 20 can comprise a user 30, a user interface module 32, a service provider 40 and an external service module 70.

The user 30 can be an individual or group that uses IP-based services provided by and through the service provider 40. The user 30 can be associated with a service provider service subscription, in which case the user 30 can be referred to as a subscriber and can have an account with the service provider 40. The user 30 can be an individual, as where a service is provided to a single person, or a group, as where a service is provided to multiple individuals, e.g., residential broadband data service provided to a family, enterprise data services provided to employees of a company, etc.

The user interface module 32 can provide a means for the user 30 to couple at least one input and/or output device to the service provider's infrastructure via an IP-enabled communications link and to interact with IP-based services via the coupled device(s). The systems and methods by which IP connectivity can be established and maintained can vary widely and are well known in the art.

Where the user interface module 32 implements at least one network, such as a residential home network, the user interface module 32 can provide local networking functions, including, but not limited to, local address assignment, host configuration, network address translation, security and access control. The transmission medium used by the user interface module 32 to communicate internally and with components of the service provider's infrastructure can be based on wireline technologies, wireless technologies, or a combination of both.

The user interface module 32 can comprise a wide range of devices, software, applications, equipment and cabling including, but not limited to, PCs, laptops, IP-enabled mobile devices (handheld computers, cellular telephones), telephones, cameras, microphones, displays, televisions, set-top-boxes, home-networking equipment (routers, switches, modems) browsers, electronic games, office automation application software, file transfer application software, etc. Although varied, these components are well known in the art.

The service provider 40 can provide at least one IP-based service to at least one user 30. The at least one IP-based service provided by the service provider 40 can include, but is not limited to, web-browsing, e-mail, electronic messaging, file-transfer, IP-based voice services, IP-based multimedia services, etc.

The service provider 40 can include an IP packet transport module 42. The IP packet transport module 42 can route and forward IP packets to and from the user interface module 32. The IP packet transport module 42 can enforce certain transport service-level agreements. The IP packets can originate at the user interface module 32 and be destined for another service provider module or the external service module 70. The IP packets can originate at the service provider 40 or the external service module 70 and be destined for the user interface module 32. All communications between the user interface module 32 and other service provider modules and/or the external service module 70 can be through IP packets routed and forwarded through the IP packet transport module 42.

The IP packet transport module 42 can comprise a wide range of devices, software, applications, equipment and cabling including, but not limited to, interconnected routers and switches, optical and electrical wiring, wireless transmitters and receivers, etc. The IP packet transport module 42 can employ a wide range of communication protocols and technologies including, but not limited to, asynchronous transfer mode (ATM), Ethernet, Frame-relay, multi-protocol label switching (MPLS), L2TP, IPSec, point-to-point protocol (PPP), SONET, EV-DO, WiMax, etc. The IP packet transport module 42 also can employ standard Internet protocols to operate the network, including, but not limited to, IP, user datagram protocol (UDP), transmission control protocol/internet protocol (TCP/IP), ICMP, OSPF, ISIS, RIP, SNMP, etc. The components, communication protocols and Internet protocols are well known in the art.

The information maintained by the IP packet transport module 42 can include information for establishing and maintaining network connectivity between modules, routing packets based on destination address and other service-related parameters, monitoring performance, measuring usage, etc. The IP packet transport module 42 can inspect an IP packet to obtain data to forward the IP packet to its destination. The IP packet transport module 42 also can incorporate devices, e.g., deep packet inspection devices, to inspect an IP packet for additional data, record that data and/or act on the IP packet as it traverses the IP packet transport module 42.

The service provider 40 can include a user account module 44. The user account module 44 can manage the information related to a user's account with the service provider 40 and associated service provisioning information. The user 30 can interact with the user account module 44 when the user 30 wants to add, modify or delete services or properties, e.g., contact information, billing information, etc., associated with the user's account. The user 30 can interact with the user account module 44 through the user interface module 32, for example, through a customer service website operated by the service provider 40 and/or through non-IP-based systems, e.g., telephone, mail, face-to-face contact with a service provider representative, etc.

The user account module 44 can consist of numerous distributed computing systems. The user account module 44 can comprise a wide variety of physical hardware, software and logical systems including, but not limited to, databases, web servers, client-server systems, element management and provisioning systems, subscriber management systems, order processing systems, customer call centers, automated voice response systems, etc. The underlying systems and methods to implement the user account module 44 are well known in the art.

The user account module 44 can interact with other service provider modules as needed to configure infrastructure in order to provide service. For example, the user 30 can establish a new DSL broadband user account with the service provider 40. The user account module 44 can interact with elements of the service provider's access and edge networks, such as digital subscriber line access multiplexers (DSLAMs), ATM switches, edge/gateway routers, etc. This interaction can be to provision a logical connection, e.g., ATM virtual circuit, Ethernet virtual local area network (VLAN), etc. with the appropriate service parameters from the subscribers home to a router at the edge of the service provider's network. This provisioning can be referred to as static because it is managed by the user account module 44 when the user 30 establishes service and can remain unchanged for an extended period of time.

The user account module 44 can contain extensive information, including, but not limited to, the following: 1) a unique user identification number; 2) billing information, such as a) a billing address, b) credit card and/or bank information, c) billing status, d) credit history, etc.; 3) contact information, such as a) at least one address in addition to the billing address, b) at least one telephone number, c) at least one e-mail address, etc.; 4) service information, such as a) at least one list of authorized services, b) service agreements, associated rates and charging methods, c) authentication and authorization credentials, e.g., user identifiers (IDs), account IDs, passwords, public key certificates, device IDs (set-top box IDs, subscriber identity module (SIM) card IDs, device media access control (MAC) addresses) d) service-specific parameters, e.g., data transport parameters (rate limits, maximum burst size, minimum guaranteed rates), at least one instant messaging (IM) identity, e-mail and/or voicemail mailbox IDs, access codes, storage quotas, content subscriptions, etc.; and 5) service provisioning information, such as a) geographic or network location of the user interface module 32, b) access link information, e.g., access link ID like ATM virtual circuit ID or VLAN IDs, lists of access network elements traversed by an access link, the name of the broadband remote access server (BRAS) device that terminates the access link, the interface identifier on the BRAS device that terminates the access link, etc.

The service provider 40 can include a service attachment module 46. The service attachment module 46 can dynamically exchange service provisioning and configuration information with the user interface module 32. Dynamic provisioning and configuration can be performed to allow the service provider 40 to allocate a limited resource, such as a public IP address, to the user 30 while the service associated with that resource is in use. Dynamic provisioning and configuration also can be performed because the information needed for configuration or the devices to be configured are known to the service provider 40 at the time when service usage is to begin. For example, the specific device that the user 30 employs to access a service can be unknown to the service provider 40 until the user 30 initiates use of the service. The service attachment module 46 also can interact with other service provider modules to manage the configuration of services provided by the service provider 40. The systems and methods used to implement the service attachment module 46 can vary by service but are well known in the art.

For video services, the service attachment module 36 can authenticate and obtain registration information associated with endpoint equipment, e.g., a set-top box, collect capability information, e.g., supported codex and/or other media capabilities, and deliver service configuration information to endpoint devices, e.g., codex, service-related server addresses, program guide carousel, etc. The components of the service attachment module 36 used for video services can include, but are not limited to, computer servers, databases, web/HTTP servers, FTP servers, multicast servers, etc. The protocols used by the service attachment module 36 for video services can be based on the use of HTTP, SOAP, XML, FTP, IGMP, etc.

The service attachment module 36 also can interact with other service provider modules to manage the configuration of services provided by the service provider 40. The systems and methods used to implement the service attachment module 36 can vary by service but are well known in the art.

The service attachment module 46 can include a network attachment module 48. The network attachment module 48 can coordinate the dynamic provisioning and configuration associated with providing the user 30 with IP-transport services. The dynamic provisioning and configuration associated with providing IP-transport services can occur before the dynamic configuration associated with higher-level services, such as voice and video, because the dynamic configuration associated with higher-level services can use the IP-access provided by the IP-transport services. Thus, the network attachment module 48 can implement the first step in a multi-step dynamic service bootstrapping process.

The network attachment module 48 can manage the dynamic assignment of public IP addresses to the user interface module 32 in support of IP-packet transport functions for IP-access service. The network attachment module 48 can communicate configuration information to the user interface module 32 in support of higher-level services. The information managed and communicated can include IP addresses for DNS servers, session initiation protocol (SIP) proxies for voice services, Interactive Program Guides (IPGs) for video services, etc.

The network attachment module 48 can comprise BRAS routers, DHCP servers, RADIUS clients and servers, databases, transport policy management systems, etc. The network attachment module 48 can use multiple protocols, including, but not limited to, PPP, point-to-point protocol over ethernet (PPPoE), dynamic host configuration protocol (DHCP), remote authentication dial-in user service (RADIUS), common open policy service (COPS), etc.

The service provider 40 can include a domain name resolution module 50. The domain name resolution module 50 can provide domain name resolution services via the DNS. When two or more IP-enabled end systems, known as hosts, communicate across an IP network, the packets exchanged between the hosts can be delivered across the network based on a unique numeric identifier, known as an IP address. Each packet can contain a source IP address, which can identify the host that sent the packet, and at least one destination IP address, which can identify at least one host that the packet can be sent to. The DNS can store and associate many types of information with domain names, which can be alphanumeric strings, typically human legible, used to identify a host on an IP-based network. In particular, the DNS can associate a domain name with an IP address. Thus, the DNS can act as a directory service, through which domain names can be translated into IP addresses, a process referred to as domain name resolution. The DNS can be implemented as a hierarchically-organized, globally-distributed system. The systems and methods used to implement the DNS are well known in the art.

The use of domain names and the DNS can be ubiquitous in IP-based networks. For example, World Wide Web uniform resource locators (URLs) can contain the domain name of the host that stores the resource associated with the URL. In the URL "http://en.wikipedia.org/wiki/Domain_name_system#History_of the DNS," the string fragment "en.wikipedia.org" can be the domain name of the host that stores the web page for the wikipedia entry that describes the DNS. Domain names and the DNS also can be used in other IP-based services.

The domain name resolution module 50 can participate in a DNS and be used for domain name resolution. To perform domain name resolution, the domain name resolution module 50 can interact with the user interface module 32. For example, software in a user's PC, known as a resolver, can send a request to the domain name resolution module 50 for the translation of a domain name, e.g., www.google.com, to the domain name's associated IP address. The domain name resolution module 50 can process the request at a DNS server that can perform a local directory look-up or can query other DNS servers in the service-provider's network or in other networks. Once the domain name resolution module 50 identifies the associated IP address, e.g., 64.233.161.99, the domain name resolution module 50 can send the associated IP address back to the user's PC. Once the PC receives the IP address, the PC can cache the IP address for a period of time based on the use of a time-to-live parameter. This caching can reduce the rate and volume of domain name resolution requests to the domain name resolution module 50 by enabling the PC to use the resolved IP address for a period of time.

The service provider 40 can include an other services module 52. The other services module 52 can manage the delivery of other services provided by the service provider 40 but not yet identified. These services can include, but are not limited to, video services, voice services, online gaming services, download services, restricted content services, security services (virus detection, intrusion detection, parental controls), storage services, personal media management services, etc. Management of the delivery of these services can involve user identification, authentication and service authorization, service delivery, performance management and usage tracking. The other services module 52 can interact with the user interface module 32.

Although the systems associated with the other services module 52 can vary by service, the systems can include, but are not limited to, servers, databases, storage systems, monitoring systems, etc. Although the methods associated with the other services module 52 also can vary by service, the methods can include, but are not limited to, common IP-based distributed systems and application technologies such as TCP, UDP, hypertext transfer protocol (HTTP), SOAP, file transfer protocol (FTP), SIP, real-time streaming protocol (RTSP), etc. The systems and methods associated with the other services module 52 are well known in the art.

Although the information managed and maintained by the other services module 52 can vary by service, the information can include, but is not limited to, user identity, authentication, service authorization, service delivery state, resource consumption, service usage, etc.

The other services module 52 can include a video services module 54. The video services module 54 can comprise that portion of the other services module 52 associated with supplying video services. Services associated with the video services module 54 can include, but are not limited to, the following: linear television service, whereby a fixed line-up of scheduled television programs is made continuously available to users; VOD, whereby users can select from a menu, or library, of video content to be delivered e.g., streamed, on demand; techniques whereby video is downloaded in advance for later consumption; delivery of media forms other than video, e.g., audio/music; etc.

The video services module 54 can perform multiple functions, including, but not limited to, ingesting, encoding and decoding, storing, managing and sending video/multimedia content. The video services module 54 also can implement signaling functions associated with sending video services. For example, the video services module 54 can implement signaling functions related to authentication and authorizing services and for controlling the selection and delivery of content. The video module also can monitor service performance and measure service usage for purposes such as billing. Elements of the video services module 54 can interact with elements of the user interface 32. This interaction can occur through the IP packet transport module 42. Elements of the video services module 54 also can interact, at the service signaling level, with elements of the IP packet transport module 42 to ensure the availability of sufficient IP packet transport resources to deliver the video service.

The data managed and maintained by the video services module 54 can include, but is not limited to, user identity, authentication and authorization, user availability and reachability, presence, resource availability and usage, service performance and usage, etc.

Although, the systems and methods associated with the video services module 54 can vary according to the services provided, said systems and methods are well known in the art. The technologies involved can be proprietary or based on public standards. For example, the systems can include, but are not limited to, content management systems, video transcoders, encryption and decryption equipment, conditional access and digital rights management systems, video transmission systems, video servers, mixers and advertisement insertion systems, service controllers, multicast servers, etc. The methods can include, but are not limited to, IP unicast, IP multicast, IP broadcast, IGMP, PIM-SM, various encoding protocols (MPEG, AVI, etc.), RTSP, HTTP, SIP, various content encryption schemes and key exchange technologies (AES, MD-5, SSL, IPSec, IKE, PKI keys), etc.

The external service module 70 can be an information, entertainment, communications, etc., service, which may or may not be commercial in nature, provided to the user 30 as accessed through the service provider 40, though the external service module 70 need not be associated with the service provider 40. The user 30 can interact with the external service module 70 through the user interface module 32 and the IP packet transport module 42. The external service module 70 can communicate directly with the IP packet transport module 42, as with, for example, direct network connection or direct network peering, or can communicate indirectly through one or more intermediary IP-based networks. The communication path between the user 30 and the external service module 70 can include public and/or private IP-based networks and can include communications across non-IP based communication channels, such as the public switched telephone network (PSTN). The transmission medium between the user 30 and the external service module 70 can include wireline technologies, wireless technologies or a combination of both.

The systems comprising the external service module 70 can include, but are not limited to, computers, databases, routers, switches, firewalls, storage devices, web servers, email servers, file servers, media servers, application servers, voice and multimedia gateways, media mixers and trans-coders, conferencing systems, etc. The systems and methods associated with the external service module 70, though widely varied, are well known in the art.

Figure 2:
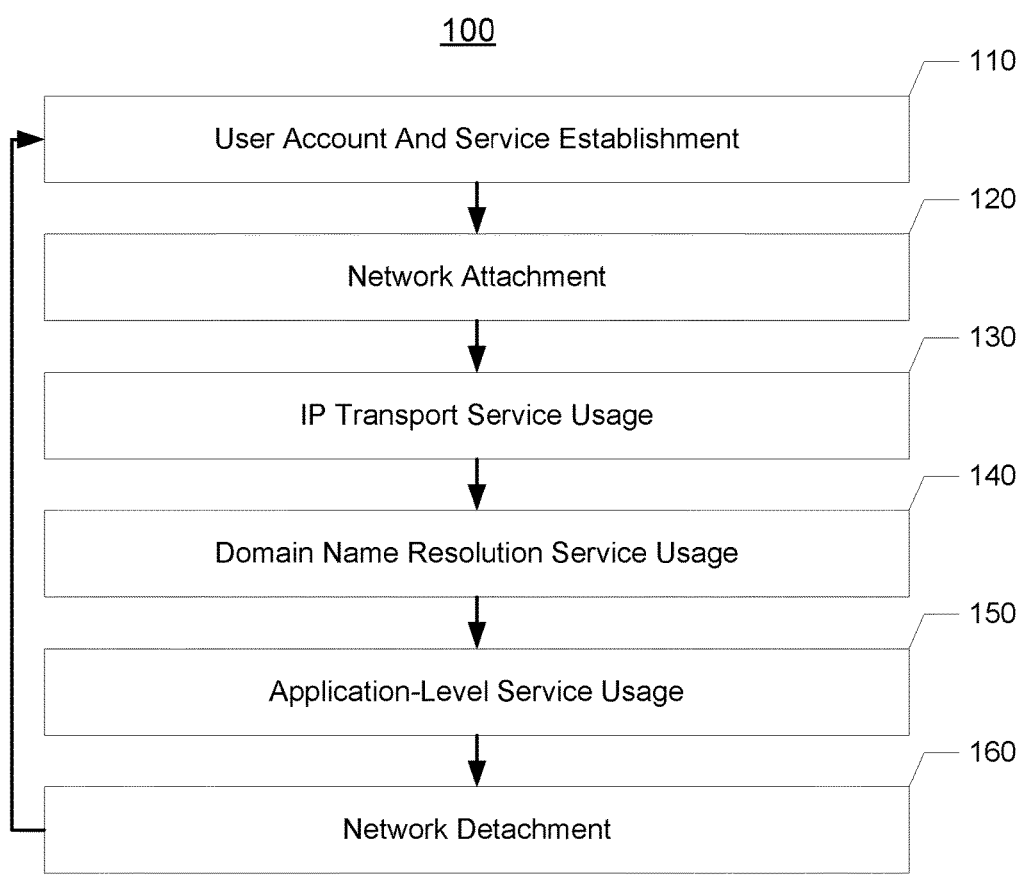
FIG. 2 is a flow chart of a method for acquiring access to and using IP-based services, according to an exemplary embodiment.

Referring to FIG. 2, a flowchart of a method for acquiring access to and using IP-based services, according to an exemplary embodiment, is illustrated. In block 110, the user 30 can interact with the service provider 40 to sign-up for at least one service and establish a user account. The user 30 can interact with the service provider 40 through the user interface module 32, for example, through a customer service website operated by the service provider 40 and/or through non-IP-based systems, e.g., telephone, mail, face-to-face contact with a service provider representative, etc.

The service provider 40 can collect user 30 and service information. The user 30 and/or the service provider 40 can configure hardware and software so the service can be delivered, which can include, at a minimum, establishing basic IP transport service.

For example, the user 30 can call the service provider 40 to request high-speed data service, voice over internet protocol (VoIP) service and/or IP-based video service. The service provider 40 can collect contact and billing information from the user 30, as well as information for provisioning the service, such as the address where service will be provided. The service provider 40 can provide the user 30 with equipment for using the service, such as a router, VoIP-enabled telephones, set-top boxes, etc. The service provider 40 and/or the user 30 can configure the equipment for use. The service provider 40 can configure the service provider's infrastructure to provide the service. For example, the service provider 40 can provision access links to the user's premises, configure account and service information in service delivery subsystems, etc. Method 100 then can proceed to block 120.

In block 120, the user 30 can establish a connection to the service provider's infrastructure via an IP-enabled communications link. The network attachment module 48 can perform dynamic service configuration to establish basic IP connectivity and basic service-level provisioning for the elements associated with the user interface module 32. For example, the network attachment module 48 can dynamically assign an IP address to an element of the user interface module 32, such as a home router. The service attachment module 46 can dynamically configure other IP-service information, including, but not limited to, addresses for DNS servers, SIP proxies, HTTP proxies, bootstrapping servers for video services, etc.

For example, the user 30 can couple a home router to a digital subscriber line (DSL) network, turn the router on and configure the router. The home router can signal the service provider's network to establish connectivity using a protocol, such as PPP, PPPoE, DHCP, etc. The service attachment module 46 can perform user authentication and authorization. The network attachment module 48 can assign a dynamic IP address to the home router, which the IP-enabled network can use to identify the host associated with the user 30. At the completion of the attachment process, the user interface module 32 can have an IP address, functioning IP connectivity to the IP packet transport module 42 and essential configuration for other services. Method 100 then can proceed to block 130.

In block 130, the user 30 can establish use of IP transport services to communicate with other IP-enabled devices reachable through the service provider's infrastructure. This capability can provide the user 30 with the ability to send IP packets to other IP addresses and to receive IP packets from other IP addresses. Method 100 then can proceed to block 140.

In block 140, the user 30 can establish use of domain name resolution services to access other services. Many application-level, IP-based services depend upon the DNS to abstract away the details of numeric IP addresses and use logical domain names instead. These applications can use DNS as a part of the application-level service. For example, when using a web-based application, such as browsing the Internet, the URLs used by the user 30 to reach a given website can be expressed, not in terms of numeric IP addresses, but rather with domain names. The same is true for the vast majority of other Internet-based applications, such as e-mail, ftp, telnet, IP-based voice and video services, etc. Method 100 then can proceed to block 150.

In block 150, the user 30 can use application-level services, such as web-browsing, e-mail, file-transfer, voice services, video services, etc. All of the communication traffic between the user 30 and the service can use IP transport services. Some of the traffic between the user 30 and the service also can use domain name resolution services. Where the application-level services usage involves video services usage, the video services module 54 can track the services usage based on a unique identifier, such as a service-specific user ID, a device ID, etc., for billing and/or other purposes. For example, the service provider 40 can offer VOD content access for an additional usage fee. The user 30 can access the VOD content using a set-top box. The service provider 40 can recognize the user's set-top box device ID, allowing the service provider 40 to track service usage for billing purposes. Method 100 then can proceed to block 160.

In block 160, the user 30 can functionally detach from the service provider's IP network. This detachment can be intentional, as where the user 30 deliberately shuts down an element of the user interface module 32, or unintentional, as where a power disruption shuts down the user interface module 32. As a result, the user interface module 32 can lose IP connectivity to the service provider's network elements, and the service provider 40 can recover for future use any dynamic resources allocated to the user 30 during block 120.

For example, if the network attachment module 48 previously had assigned a dynamic IP address to the user's home router, that IP address can be deallocated and disassociated from that user's home router. The service provider 40 can then assign the IP address to a different user 30.

The period in time during which a specific user 30 is associated with a specific IP address can be the user's IP access session. An IP access session can begin when the service provider 40 allocates an IP address to a specific user 30 and can end when the service provider 40 deallocates that IP address from that user 30.

An IP access session can begin via either static or dynamic processes. For example, the user's IP address can be statically allocated when the user 30 establishes an account with the service provider 40 in block 110, in which case the IP access session begins when the user 30 establishes the account and can last as long as the user 30 maintains the account with the service provider 40. The user's IP address can be dynamically allocated by the network attachment module 48 in block 120, in which case the IP access session can begin when the IP address is allocated and can end when the IP address is deallocated in block 160. Where the IP address is dynamically allocated, the user 30 can have multiple IP access sessions during the time that the user 30 maintains an account with the service provider 40. Each IP access session can involve a different IP address allocated by the network attachment module 48. The user 30 can have multiple IP access sessions at the same time if, for example, the user 30 has a user interface module 32 that can establish multiple simultaneous IP connections to the IP packet transport module 42.

For example, the user 30 can establish DSL broadband service with the service provider 40, with the user 30 obtaining, installing and configuring any equipment and the service provider 40 performing any initial service configuration. The user 30 can turn on the user's DSL modem and/or home router. The home router can negotiate connectivity and host configuration parameters with the service attachment module 46, using DHCP, for example. This negotiation can include a request for and subsequent assignment of an IP address to the home router. Once this negotiation has been completed, the IP access session can begin.

The IP access session can last as long as the service provider 40 associates the assigned IP address to the user's home router. This association can end for any number of reasons. For example, where the home router is using DHCP for network configuration, the association can end if the DHCP lease period for the address expires before the home router renews it, in which case the home router can lose connectivity to the service provider 40, and the IP access session can end. Returning to FIG. 2, after the user 30 functionally detaches from the service provider's network, Method 100 then can proceed back to block 110.

In block 110, the user 30 can reestablish the connection to the service provider's infrastructure via an IP-enabled communications link. For example, if the detachment in block 160 was unintentional, the user 30 can resolve any problems that resulted in the detachment and reestablish the connection. If the detachment in block 160 was intentional, the user 30 can reestablish the connection at the user's convenience. When the user 30 reattaches to the network and receives a new, or even the same, IP address, a new IP access session can begin. The concept of an IP access session can apply to wireless-based IP access services, as well as to wireline-based services.

A variety of information can be associated with an IP access session, either directly or indirectly. IP access session information can include the IP address assigned to the user 30 by the service provider 40, by which the user 30 can be reachable by other hosts on the network. IP access session information can include an IP access session ID, a unique identifier assigned to the IP access session by the service provider 40. The IP access session ID can be used by the service provider 40 for internal data management purposes as a key for retrieving information associated with the IP access session. IP access session information can include network access information. Network access information can identify the network access facilities being used during the IP access session. Network access information can include, for example, an identifier for the IP access session network connection used to reach the user 30 and the name of the BRAS on which the access connection is terminated. IP access session information can include IP access session lifecycle information. This IP access session lifecycle information can include, but is not limited to, the session start time, the session state, e.g., active/ongoing or inactive/terminated and, if terminated, the session stop time.

IP access session information can include user identity information. User identity information can be information that either directly or indirectly identifies the user. For example, direct identification information can include a unique user ID assigned to the user 30 by the service provider 40 at the time that service is established and provided by the user 30 to establish a connection to the service provider's infrastructure, e.g., user ID authentication credentials passed during PPP negotiation. Indirect identification information can include the network access information previously described, e.g., the user's IP access session network connection identifier and terminating BRAS. Using the network access information, the user's identity can be obtained by associating the information with information stored in other databases managed by the service provider 40, e.g., network provisioning databases.

Information that can be indirectly linked with an IP access session can be separated into two classes: 1) information that can be linked to an IP access session via knowledge of the user's identity and 2) information that can be linked to an IP access session via knowledge of the IP address associated with the session. Examples of user identity linked information can include, but is not limited to, user contact information, e.g., mailing address, telephone number, e-mail address, etc., demographic information, service subscription information, etc. Examples of IP address-linked information can include, but is not limited to, information related to specific patterns of service usage collected based on IP address during the IP access session. These classes of information linked indirectly with an IP access session can, in turn, be linked with each other through their association with the IP access session. Thus, it is possible, in principle, to use an IP access session to associate information keyed based on an IP address to a specific user 30. This association, once made and recorded, can persist beyond the duration of the IP access session.

IP access session information can reside in multiple locations throughout the service provider's infrastructure. Direct information, such as the IP access session identifier, allocated IP address, network access information and user information can reside within the service attachment module 46. The service provider 40 can elect to extend the function of the service attachment module 46 to dynamically collect, organize and manage this information as IP access sessions come and go over time. User identity linked information can reside in the user account module 44, including in user account and/or user service configuration databases. User identity linked information also can reside in modules that implement individual services, including, but not limited to, the IP packet transport module 42 and the other services module 52. IP address linked information can reside in the IP-based service modules, including, but not limited to, the IP packet transport module 42, the domain name resolution module 50 and the other services module 52.

Based on this description of an IP access session and the information associated therewith, certain properties of an IP access session can be identified. For each IP access session, the user 30 can be associated uniquely with an IP address. This property can have two important implications: 1) for each IP access session, the IP address can be used to identify the user 30 and can be used to communicate with the user 30 for the duration of the IP access session; and 2) any information collected during the IP access session concerning the use of services and based on the IP address can be associated with the user 30. Thus, any IP service usage that reveals relevant marketing information about the user 30 can be collected during the IP access session and used later in that session to send marketing content addressed to the IP access session IP address over an IP-based communication channel or processed and associated with the user 30 for subsequent use.

An IP access session can persist for a long time, e.g., days, weeks, months or even years. This property can be especially true for IP access sessions based on wired network connections because such connections can be established and maintained indefinitely. Wireless IP access connections, and the associated IP address assignments, can be more transient due to mobility issues and device power constraints. An IP access session can last longer than the online session of the user 30. This situation can be especially true where the user accesses IP-based services through a device, e.g., a PC, coupled to a home network. Although the user 30 can shutdown the PC after a period of usage, the IP access session can persist as long as the user's home router remains powered and coupled to the network. Thus, when the user 30 turns on the original PC, or some other device, such as a set-top box, that can couple to the home network, for another period of usage, that subsequent period of usage can continue to be associated with the same IP access session as the earlier period of usage. This situation can exist because the IP access session can be associated with the IP address provided and assigned to the user's home router by the service provider 40. Although the user's home network can support a variety of IP hosts over an extended period of time using network address translation (NAT) and other private networking techniques, the service provider 40 addresses each of the hosts via the IP address assigned to the home router. Enterprise networks can function similarly.

An IP access session can involve multiple platforms. The user interface module 32 can comprise a private network that contains multiple IP-enabled devices, e.g., PCs, laptops, set-top boxes, etc., all accessed through a single IP connection managed by a home-router. Again, the service provider 40 can address each of the devices through a single IP address assigned to the home router. Thus, a single IP access session can involve multiple devices either over time or at about the same time.

An IP access session can be treated anonymously or non-anonymously. A system or service can address the user 30 through the IP address associated with the IP access session without determining the user's identity. On the other hand, the service provider 40 can combine information associated with the IP access-session, such as a user ID, with other information in its system, such as information in a customer account database, to determine the user's identity.

An IP access session can be tracked. The service provider's infrastructure can contain elements in the service attachment module 46 for dynamic assignment of IP addresses and/or the user account module 44 for static assignment of IP addresses that can be well-suited for tracking when an IP access session begins and ends. These elements can track and manage information about the lifecycle of each IP access session.

Figure 3:
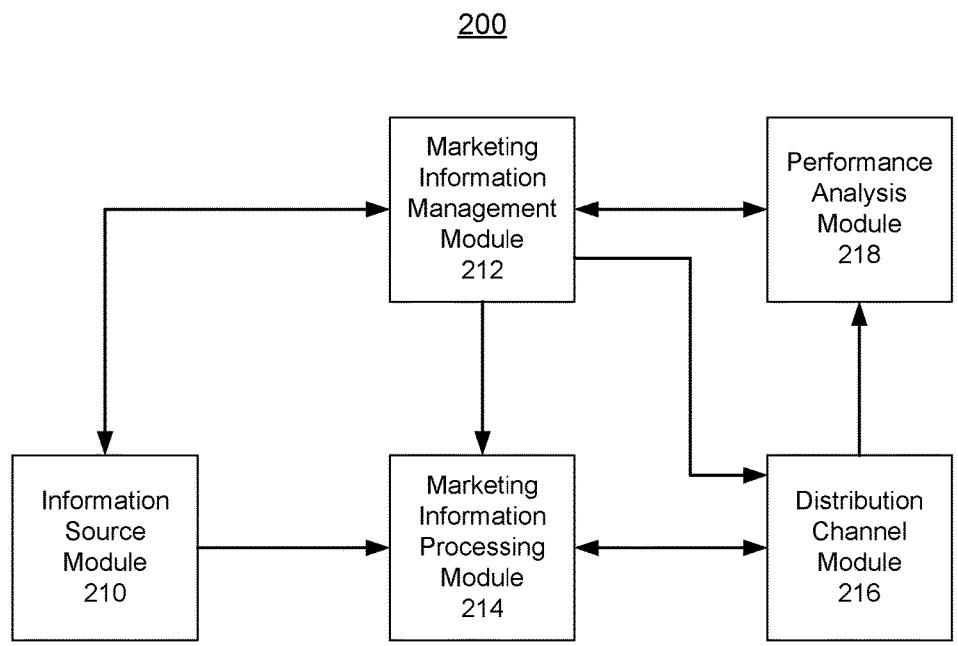
FIG. 3 is a schematic diagram of a system for providing targeted marketing services, according to an exemplary embodiment.

Referring to FIG. 3, a schematic diagram of a system for providing targeted marketing services, according to an exemplary embodiment, is illustrated. System 200 can comprise at least one information source module 210, a marketing information management module 212, a marketing information processing module 214, a distribution channel module 216 and a performance analysis module 218.

The information source module 210 can collect information and forward that information to the marketing information processing module 214. The information source module 210 also can process the information before forwarding.

The information collected by the information source module 210 can be receptiveness information and/or addressability information. Receptiveness information can be information that pertains to an individual's or a group's potential receptiveness to marketing content, e.g., a propensity to purchase a product. Receptiveness information can come from a wide variety of sources and can be of varying types. For example, receptiveness information can include demographic information, e.g., race, age, gender, income, education, etc. Receptiveness information can include geographic information, e.g., current location, location of residence, country, state, town, zip code, etc. Receptiveness information can include membership information, e.g., current or past memberships in social, professional, religious and/or other organizations. Receptiveness information can include purchasing behavior, e.g., records of past purchases, such as grocery store purchases, recent shopping patterns, records of product research, etc. Receptiveness information can include personal interest information, e.g., newsletter and magazine subscriptions, participation in activities, frequent visits to certain websites, etc. Receptiveness information can include information that can be considered personal.

The nature of receptiveness information can range from generic, e.g., demographic or interest profile information, to marketing campaign specific, e.g., knowledge of a former customer. Regardless of the nature of the information, receptiveness information relevance, in terms of predicting receptiveness to marketing content, can be measured with respect to that marketing content. Individual pieces of receptiveness information can be combined and processed in various ways to increase the predictive capability of the aggregated information over that of the individual pieces.

Addressability information can be information used to send marketing content to an individual or a group. Like receptiveness information, addressability information can come from a wide variety of sources and can be of varying types. For example, addressability information can include a mailing address that can be used to send marketing content through the U.S. postal service or a private courier. Addressability information can include a telephone number that can be used to send marketing content via telephone, e.g., telemarketing. Addressability information can include an e-mail address that can be used to send marketing content via electronic mail. Addressability information can include an HTTP cookie that can be used to recognize the user 30 at a future point in time, whereupon the web content delivered to the user 30 can be customized to send marketing content, e.g., a targeted advertisement. Addressability information can include an IP address that, similar to the HTTP cookie, can be used to recognize and interact with the user 30 at a future point in time within the duration of an IP access session, whereupon the IP service being used can be modified to send marketing content.

Addressability information can be considered personally identifiable information (PII), which can be considered non-anonymous, if, given the information, the identity of the individual or group associated with the information can be identified either directly from the information itself or when easily combined with other publicly available information. Examples of addressability information that can be considered PII can include, but are not limited to, full name, postal address, telephone number and e-mail address. Examples of addressability information that can be considered non-PII can include, but are not limited to, IP address and HTTP cookies, as long as the cookie does not contain PII. The distinction between PII and non-PII addressability information can be important to targeted marketers because anonymous marketing techniques can be considered more desirable, from a privacy standpoint, than non-anonymous marketing techniques.

To be of value for TMS, each piece of receptiveness information can be associated with some type of addressability information and vice versa. For example, receptiveness information that someone visited a website dedicated to providing data to individuals shopping for a certain product, e.g., automobiles, can provide little value to a targeted marketer, if no information exists that can identify where the targeted marketer can send marketing content to that visitor. Conversely, that same information combined with addressability information that identifies where the targeted marketer can send marketing content to the visitor can be of greater value.

The information source module 210 also can collect and send data related to the operation of the information collection process, e.g., status, configuration, resource consumption, processing rate, match rates, etc., to the marketing information management module 212.

The marketing information management module 212 can manage the configuration of and control the information associated with at least one marketing campaign being conducted by System 200. The marketing information management module 212 can receive and maintain information about the marketing campaign, including, but not limited to the following: who is sponsoring the marketing campaign and billing information for the sponsor; how to identify a target audience member (TAM), e.g., what receptiveness information to look for; which distribution channels to use and the associated addressability information to acquire; what marketing content to deliver; how long the marketing campaign will last; and what performance metrics to use for the campaign and current performance relative to those metrics. The marketing information management module 212 can send relevant portions of this information to the other elements of System 200 to control, manage and monitor those elements' functions.

The marketing information processing module 214 can receive and process information from the information source module 210 in conjunction with the control information received from the marketing information management module 212 to produce and use actionable marketing information (AMI).

AMI can be receptiveness information associated with addressability information. AMI can be the basis for controlling a targeted marketing campaign. The effectiveness of AMI at controlling a targeted marketing campaign can depend on the quality of the receptiveness information and the addressability information. The metric for measuring how well the receptiveness information and, by extension, the AMI can be used to predict the receptiveness of a target TAM to the marketing content can be deemed predictive ability. The metric for measuring how accurately the addressability information and, by extension, the AMI can be used to deliver marketing content to a targeted audience member, while avoiding delivery to non-targeted individuals, can be deemed targeting accuracy. For example, AMI that can be used to deliver marketing content to a targeted individual can have greater targeting accuracy than AMI that can be used to deliver marketing content to a group to which that individual belongs, e.g., a household or a company. High-value AMI can have high predictive ability and high targeting accuracy.

The value of AMI also can be affected by other attributes of the information that comprises the AMI, including, but not limited to, the following: 1) timeliness, including how quickly the information can be acquired, processed and acted upon; 2) privacy attributes, including whether the information is anonymous, collected with the knowledge and permission of the owner, retained for an extended period of time, shared with others, etc.; 3) source, including any restrictions imposed on use of the information; 4) cost, including the cost to acquire, process and act upon the information; 5) scope, including the breadth of the information. For example, a source of information can produce AMI with a high predictive ability but applicable only to a small potential audience. Another source of information can produce AMI with lower predictive ability but applicable to a large potential audience. An ideal source of information can produce highly predictive AMI with high targeting accuracy and with wide scope, leading to the identification of a large audience of receptive individuals that can be accurately targeted.

The marketing information processing module 214 can combine individual units of receptiveness information, addressability information and AMI to improve the quality of AMI and generate new AMI. For example, by combining information about multiple websites visited by the user 30, the marketing information processing module 214 can be able to generate AMI with higher predictive ability than AMI based on one website visited by the user 30. AMI with higher targeting accuracy also can be generated. For example, using information about the user's IP address during an IP access session to determine the user's mailing address by cross-referencing data stored in the service attachment module 46 and the user account module 44, the marketing information processing module 214 can associate relevant IP service usage information to the user's mailing address, enabling the IP service usage information to be used to drive a direct mail campaign based on knowledge of the user's mailing address.

The distribution channel module 216 can send marketing content once the marketing information processing module 214 combines AMI with marketing content from the marketing information management module 212. A wide range of distribution channels can be employed by the distribution channel module 216 to send marketing content. The distribution channel module 216 can use an on-demand distribution channel, e.g., direct mail. Marketing content can be sent to the user 30 through an on-demand distribution channel at any time. The distribution channel module 216 can use an opportunistic distribution channel, e.g., a web advertisement insertion server. Marketing content can be sent to the user 30 through an opportunistic distribution channel only when the opportunity exists to do so. For example, a web advertisement insertion server can insert a web advertisement targeted to the user 30 into the web page of a website when the server detects the presence of the user 30 at the website. Thus, the advertisement can be sent to the user 30 only when the user 30 visits a website served by that advertisement insertion server. Once the distribution channel module 216 sends marketing content to a TAM, the distribution channel module 216 can send feedback to the marketing information processing module 214 to influence future decisions.

The performance analysis module 218 can receive information from the marketing information management module 212 and the distribution channel module 216 to measure the effectiveness of at least one marketing campaign. The performance analysis module 218 also can identify means for marketing campaign optimization and report results back to the marketing information management module 212. The performance analysis module 218 can include mechanisms for detecting and analyzing responses from both targeted and non-targeted audience members.

Figure 4:
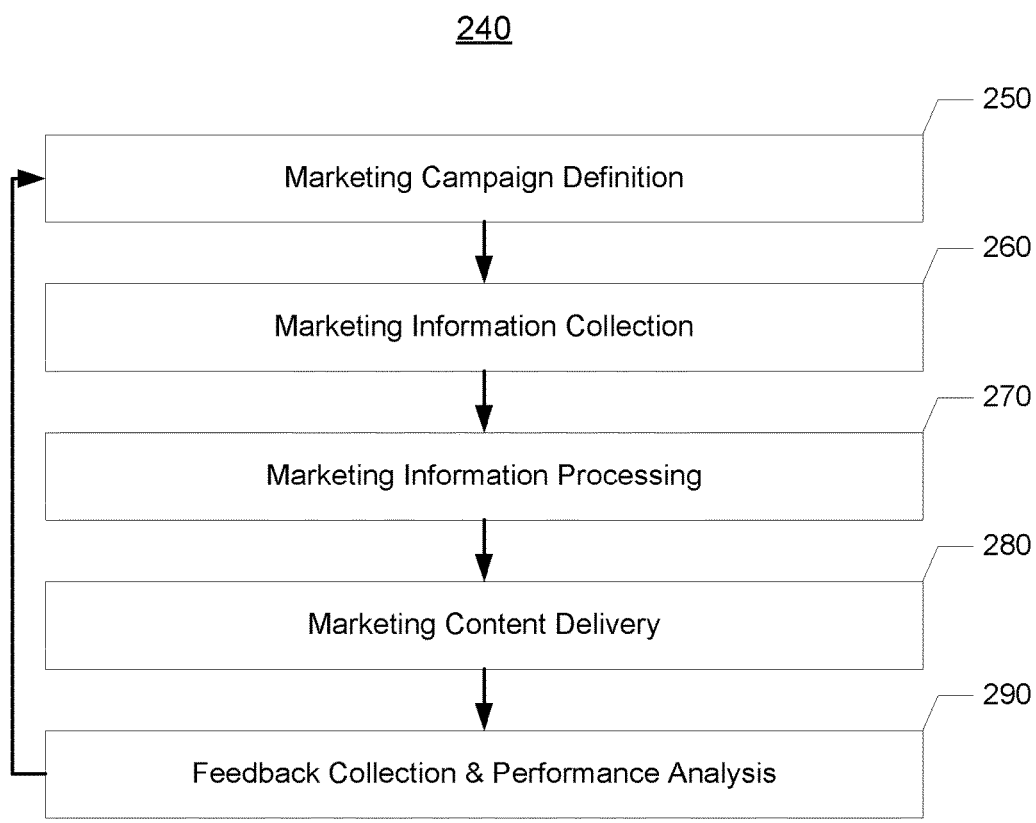
FIG. 4 is a flow chart of a method for providing targeted marketing services, according to an exemplary embodiment.

Referring to FIG. 4, a flowchart of a method for providing targeted marketing services, according to an exemplary embodiment, is illustrated. In block 250, the marketing information management module 212 can create, define and organize at least one marketing campaign. This process can include processing the information about the marketing campaign previously identified as received and maintained by the marketing information management module 212. Method 240 then can proceed to block 260.

In block 260, the information source module 210 can collect source marketing information about at least one potential audience member (PAM). A PAM can be an entity considered for inclusion in at least one target audience for at least one marketing campaign. A PAM can be an individual or a group. The relationship between a PAM and one or more individuals can be determined by the nature of the information that can be used to address the entity. One or more unique identifiers can potentially be associated with a PAM. Depending on the embodiment of the TMS system, such identifiers can include, but are not limited to, user IDs, IP access session IDs, device IDs, unique IDs embedded in HTTP cookies, various other service-related IDs, etc. A unit of AMI can be associated with a PAM.

The information source module 210 can collect source marketing information from multiple locations and can incorporate previously described elements of the service provider's infrastructure. The user account module 44 can contain valuable information about the user 30, including, but not limited to, where the user 30 is located, how to reach the user 30, what services the user 30 uses and how those services are provisioned. This information can include both addressability information, e.g., mailing address, e-mail address, telephone number, etc., and receptiveness information, e.g., services used, location, etc. For example, location can serve as receptiveness information because location can be used to select or filter at least one PAM. User location can be obtained in a number of ways, including, but not limited to, directly from existing information, e.g., zip code, telephone area code, etc., or inferentially from access connection configuration information, e.g., combining information about the user's terminating BRAS with information about the location of the BRAS.

Information contained in the user account module 44 also can be linked with other information sources, in much the same way that primary and foreign keys can be used in relational databases to link together information stored in different database tables. For example, a set-top box ID can be used to link video service usage information to a user account ID and subsequently back to the user's address for billing purposes. Similarly, the relationships between the set-top box ID, the user account ID and the user's address can be used to link receptiveness information, e.g., video service usage, to addressability information, e.g., mailing address, for targeted marketing purposes. Information in the user account module 44 that can serve, in one form or another, as a key/relational link for linking other pieces of information can include, but is not limited to, the following: unique user identifiers, e.g., a unique subscriber account number; e-mail addresses; telephone numbers; service authentication and identifying credentials, e.g., user IDs, public key certificates, private shared secrets, etc.; user device IDs, e.g., set-top box IDs, SIM-card IDs, device MAC addresses, etc.; and/or uniquely identifying access link information, e.g., a user's access circuit ID combined with an identifier for the circuit's terminating BRAS.

As previously described, the systems and methods comprising the user account module 44 are well known in the art. For the purposes of using elements of the user account module 44 as part of the information source module 210, these same systems and methods can be used. Some extensions can be implemented to expose the information in the user account module 44 to other components of the information source module 210 or to organize the information in a more suitable manner for use. The same fundamental information technologies underlying the service provider's use of the user account module 44 to deliver IP-based services, however, can be used to implement elements of the user account module 44 as part of the information source module 210.

The information source module 210 can support multiple means for accessing marketing information contained in the user account module 44. For example, other components of the information source module 210 can be enabled to query elements of the user account module 44 for relevant marketing information. Support for such queries can be general and can, for example, include mechanisms for retrieving information based on a wide range of query attributes, including, but not limited to, user ID, access-link-information, other identifiers associated with the user 30 or the user's equipment, address information, etc. The information retrieved by such queries also can include all or part of the information identified as potential query attributes. The interface between the relevant elements of the user account module 44 and other components of the information source module 210 also can support asynchronous notification functions, whereby the other components can be notified asynchronously of changes in the state of the information maintained by the user account module 44. The interfaces between the relevant elements of the user account module 44 and other components of the information source module 210 can include at least one of the interfaces used by the user account module 44 in support of the delivery of IP services.

Elements of the service attachment module 46, in general, and the network attachment module 48, in particular, also can comprise elements of the information source module 210. The network attachment module's ability to manage the use of IP addresses and track the lifecycle of IP access sessions can make the network attachment module 48 a valuable source of marketing information. Information about the user's IP access session maintained by the network attachment module 48 can include, but is not limited to, the following: a unique IP access session identifier, a unique IP address; a unique user identifier; unique information about the user's access connection, e.g., BRAS identifiers, access circuit identifiers, etc.; and IP access session lifecycle information, e.g., status, start time, end time, etc. This information can be used to associate the user 30 with an IP address during an IP access session. Thus, during an IP access session, any information that can be associated with an IP address also can, in turn, be associated with the user 30 associated with that IP address.

This association between the user 30 and the IP address can be used to obtain addressability information in at least two ways. First, the IP address itself can be addressability information because it can be used to directly address the user 30. For example, the user 30 can be browsing a website, and the web-server delivering the content can recognize the user 30 based on the source IP address of the HTTP request. The web-server can use the IP address to insert or otherwise send targeted marketing content into the content sent to the user 30. A similar approach can be applied to services other than web-browsing, such as video-on-demand service, for example.

Second, the IP address to user association maintained by an IP access session can be used to relate an IP address to more extensive addressability information. For example, the information source module 210 can collect useful receptiveness information, e.g., information that the user 30 has visited a website of interest, and this receptiveness information can be associated with an IP access session IP address. The receptiveness information then can be linked back to the user 30 via the IP address to user association. The user 30 then can be linked to more extensive addressability information, e.g., mailing address, phone number, e-mail address, etc., associated with the user 30 elsewhere in the service provider's system. Thus, the information relating an IP address to a user 30, at a given point in time, can be used to connect to more extensive addressability information beyond the IP address alone.

This association between the IP address and the user's unique identifier at a given point in time can be direct and explicitly maintained in the network attachment module 48. The association between the IP address and the user's unique identifier at a given point in time can be indirect and can be associated via one or more association steps. For example, the network attachment module 4837 can maintain information associating the use of an IP address at a given point in time to information that uniquely identifies the user's access connection, e.g., BRAS and circuit ID. The information that uniquely identifies the user's access connection can, in turn, be associated with other information in the user account module 44 and/or the network attachment module 48 that relates the user's access connection information to the user's unique identifier.

The addressability information accessible through the network attachment module 48 can be either PII or non-PII, depending on the service provider's approach and policies. For example, when an IP address is used as addressability information to send marketing content to the user 30 associated with an IP access session, the addressability information can be considered non-PII because the IP address, and it's usage at a given point in time for IP-based services does not personally identify the subscriber, nor can the IP address be easily combined with publicly available information to uniquely identify the user 30. Conversely, when the IP address associated with the user 30 during the course of an IP access session is combined with other addressability information maintained by the service provider 40, such as user account information maintained in the user account module 44, the IP address can be used to obtain and link PII addressability information, e.g., a mailing address, to the user 30 and the user's receptiveness information.

The association between the user 30 and the IP address also can be used to obtain receptiveness information in at least two ways. First, just as the association between an IP address and a user ID can be used to associate receptiveness information to extended addressability information, the same association can be used to associate multiple pieces of receptiveness information to the user 30. The continuity of the association between the user 30 and an IP address during an IP access session can allow any receptiveness information keyed to the IP address during the IP access session to be associated with the user 30. This concept can apply both to information collected across multiple sources and information collected over time.

Figure 5:
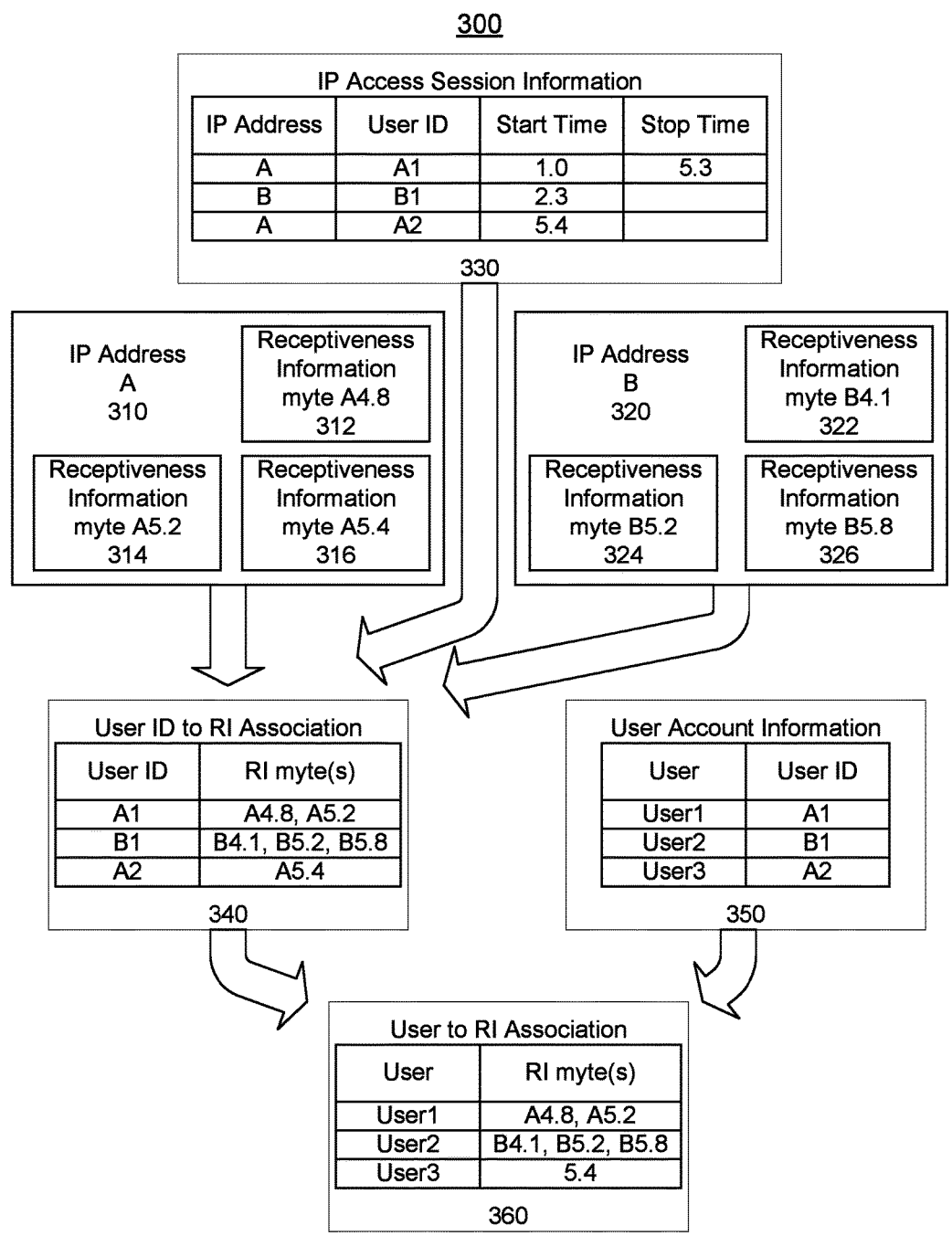
FIG. 5 is a block diagram showing relationships between information to enable associating IP address-keyed receptiveness information to users, according to an exemplary embodiment.

Referring to FIG. 5, a block diagram showing relationships between information to enable associating IP address-keyed receptiveness information to users, according to an exemplary embodiment, is illustrated. Block 310 can represent mytes of receptiveness information generated using IP Address A over a given period of time. A myte can be defined as an individual unit of marketing information. The defining characteristic of a myte can be that the marketing information can be linked, either directly or indirectly, to a PAM. A myte that contains receptiveness information can be a receptiveness information myte (RI-myte). A myte that contains addressability information can be an addressability information myte (AI-myte). Multiple mytes can be linked and combined in various ways to create AMI and to determine whether to target a PAM for marketing content delivery. Block 312 can represent an RI-myte generated at time 4.8 (RI-myte A4.8). Timestamp "4.8" can be a simplified representation, for exemplary purposes, of a measurement of a point in time. The timestamp used can be a measurement of the number of seconds since Jan. 1, 1970, e.g. "11804744374," a YYYY.MM.DD.HH:MM:SS format, e.g., 2007.06.01.22:05:36, or any other format to denote a distinct point in time. Block 314 can represent an RI-myte generated at time 5.2 (RI-myte A5.2). Block 316 can represent an RI-myte generated at time 5.6 (RI-myte A5.6).

Block 320 can represent mytes of receptiveness information generated using IP Address B over a given period of time that overlaps with the given period of time that RI-mytes are being generated using IP Address A. Block 322 can represent an RI-myte generated at time 4.1 (RI-myte B4.1). Block 324 can represent an RI-myte generated at time 5.2 (RI-myte B5.2). Block 326 can represent an RI-myte generated at time 5.8 (RI-myte B5.8).

Block 330 can represent IP access session information maintained by the service provider 40 in at least one module. The network attachment module 48 can have allocated IP address A to a user (User1) with user ID A1 at time 1.0 and de-allocated IP address A from User1 at time 5.3. The network attachment module 48 can have allocated IP address B to a second user (User2) with user ID B1 at time 2.3 and not yet de-allocated IP address B from that User2. The network attachment module 48 can have allocated IP address A to a third user (User3) with user ID A2 at time 5.6 and not yet de-allocated IP address A from User3.

By combining the information available in Block 310 with the information available in Block 330, the service provider 40 can associate each RI-myte with the user ID using IP address A when the RI myte was generated. By combining the information available in Block 320 with the information available in Block 330, the service provider 40 can associate each RI-myte with the user ID using IP address B when the RI myte was generated. Thus, the service provider 40 can associate RI-mytes A4.8 and A5.2 with user ID A1, RI-mytes B4.1, B5.2 and B5.8 with user ID B1 and RI-myte A5.4 with user ID A2 as represented in Block 340.

Block 350 can represent user account information maintained by the service provider 40 in at least one module. The user account information can associate each user with the user's user ID. By combining the information available in Block 350 with the information available in Block 340, the service provider 40 can associate each RI-myte with a specific user and other information associated with that specific user. Thus, the service provider 40 can associate RI-mytes A4.8 and A5.2 with user User1, RI-mytes B4.1, B5.2 and B5.8 with user User2 and RI-myte A5.6 with user User3 as represented in Block 360. This association with each specific user can include association with each specific user's name, address, telephone number or any other addressability information associated with the specific user that can be maintained in the service provider's system.

The second way that IP access session information can be used as receptiveness information is by using the IP address associated with an IP access session to infer information about the geographic location of the user 30. For example, the service provider 40 can associate at least one contiguous range of IP addresses to a single network access element, e.g., a BRAS. Each single network access element, in turn, can service only users in a single geographic area. In a DSL service scenario, the BRAS can be located in a telephone company's central office and can service only users whose telephone lines are serviced by that central office. Thus, the geographic scope of the IP addresses associated with the BRAS can be limited to a small geographic area, e.g., addresses within a single zip code or a small number of zip codes.

The information source module 210 can support multiple means for accessing marketing information contained in the network attachment module 48. For example, other components of the information source module 210 can be enabled to query elements of the network attachment module 48 for relevant marketing information. Support for such queries can be general and can, for example, include mechanisms for retrieving information based on a wide range of query attributes, including, but not limited to, a user ID, an IP address and timestamp, a unique IP access session ID, unique user access connection information, etc. The information retrieved by such queries also can include all or part of the information identified as potential query attributes.

The interface between the relevant elements of the network attachment module 48 and other components of the information source module 210 also can support asynchronous notification functions, whereby the other components can be notified asynchronously of changes in the state of the information maintained by the network attachment module 48. For example, the network attachment module 48 can notify at least one other component of the information source module 210 when an IP access session associated with a given IP address ends, so that session-related information can be updated, consolidated or otherwise processed. The interfaces between the relevant elements of the network attachment module 48 and other components of the information source module 210 can include at least one of the interfaces used by the network attachment module 48 in support of the delivery of IP services.

Elements of the video services module 54 also can comprise elements of the information source module 210. A user's video services usage can be a source of marketing information. The kinds of marketing information that can be collected from the video services module 54 include, but are not limited to, the following: data pertaining to video services usage, data used to link an RI-myte to a specific user, data indicating at least one marketing campaign for which an RI-myte can be relevant, etc. Data used to link information to a specific user can include, but is not limited to, at least one video services-level user identifier or authentication credential (user ID, SIP-uniform resource identifier (URI), http-cookie ID, public key, shared secret), at least one video services-level device identifier (set-top box ID, SIM ID, MAC address), an IP address and timestamp, etc.

Rather than collecting data from all video services usage, more selective methods can be employed. The video services module 54 can collect a limited amount of data based on a variety of filtering criteria. These filtering criteria can be provided by the marketing information management module 212. For example, the video services module 54 can collect information from video services usage by a limited set of users, e.g., as identified by IP-address and/or for a limited set of communicating endpoints or end-systems, e.g., as identified by IP-address. These filtering criteria can manage the volume of data gathered, while retaining the data value.

The video services module 54 can collect data from the video services usage of interest to permit the information source module 210 to associate RI-mytes with the user 30 whose actions resulted in generation of the RI-myte. This data can include, but is not limited to, a timestamp of the time at which the video services module 54 generated the data, the IP address of the source of the data, service specific user identifiers, etc.

The user endpoint device that originates video services data can be operating on a private network using private/non-routable IP addresses, such as might occur for a set-top box operating in a home network. As the IP packets traverse the routing device, e.g., home router, that is responsible for managing the private address space, a NAT operation can be performed on the packets, as is well known in the art. This NAT operation can translate the private source IP address of the packet into the public (and routable) IP address associated with the user 30. It is this public IP address that can be seen and captured by the video services module 54.

The video services module 54 can generate an RI-myte each time that the video services module 54 collects data. These RI-mytes can be aggregated and combined with other information in various ways. For example, the user's device ID can be combined with information available in the service attachment module 46 to associate the data with the user 30. The time at which the data was generated and the IP address of the source of the video services data also can be combined with information available in the network attachment module 48 to associate the data with an IP access session and, hence, the user 30. Using either of these approaches, receptiveness information generated during video services module usage can be associated with the user 30 and, possibly, associated with the user's addressability information.

The information source module 210 can support multiple means for accessing marketing information contained in the video services module 54. For example, a near-real-time stream can be implemented whereby each time that an RI-myte is generated, the RI-myte is delivered to at least one other component of the information source module 210. The RI-mytes also can be collected and delivered in non-near-real-time. Other components of the information source module 210 also can be enabled to query elements of the video services module 54. The data delivered to other components of the information source module 210 can include, but is not limited to, the following: the device ID of the source of the IP packet, a timestamp of the time at which an IP packet associated with video services was received, the IP address of the source of the IP packet, the video service being accessed, a list of at least one marketing campaign or other pattern matching information that the IP packet associated with the record matched, etc.

A wide range of matching, filtering and aggregation functions can be implemented within the video services module 54. These functions also can be implemented elsewhere in the information source module 210 or in the marketing information processing module 214. Elements of the video services module 54 also can be part of the marketing information processing module 214.

The interfaces between the relevant elements of the video services module 54 and other components of the information source module 210 can include at least one of the interfaces used by the video services module 54 in support of the delivery of IP services. For example, the hardware and software that comprise the video services module 54 can be extended to support the additional functionality associated with the information source module 210. In other words, the information source module functions can be integrated directly into the video services module 54 systems themselves. As the video services module 54 performs the functions associated with video services usage, it also can perform the information source module 210 functions. The existing video services module 54 also can be left in place and an additional processing element added to perform the information source module functions with traffic mirroring techniques used to duplicate part or all of the IP traffic.

A variety of technologies exist that can be used to implement the data collection functions. These technologies are well known in the art. The technologies can include, but are not limited to, the use of routers and switches, application proxies and gateways, etc. These technologies can be deployed in a variety of ways. For example, proxies, gateways and/or data collection devices can be placed in line with the primary IP packet transport pathways. Such inline techniques can be useful when used in conjunction with other techniques for inserting information, or otherwise modifying the packet traffic between the communicating endpoints, e.g., inserting marketing content.

The physical elements that embody the video services module 54 portion of the information source module 210 can be distributed throughout the service provider's video services module 54. Accordingly, distributed systems technologies can control, configure, manage and aggregate information associated with these elements. The information technologies associated with implementing such distributed systems are well known in the art.

Returning to FIG. 4, the marketing campaign definition in block 160 can influence the collection of source marketing information in block 165. For example, the volume of video services usage on a service provider's network can be large. Moreover, much video services usage can be irrelevant to predicting activities of interest. Therefore, as part of the marketing campaign definition in block 160, the marketing information management module 212 can deliver information used by the information source module 210 to filter the information collected from the video services module 54.

The information supplied by the marketing information management module 212 can include, but is not limited to, filtering information that can be used to differentiate between video services usage that is of interest and video services usage that is not. This filtering information can relate to a variety of attributes which can include, but are not limited to, the IP address of the source of the video services, the video service being used, at least one marketing campaign identifier (or other use indicator(s)) associated with the filter parameter, etc.

For example, the marketing information management module 212 can specify at least one filter description to be sent to the marketing information processing module 214 or to the information source module 210 that contains the following information for each description: at least one video asset filter pattern that can be used to identify one or more video assets that are of interest and at least one marketing campaign identifier. The video asset filter pattern can be used to identify video services usage events to select for further processing. For example, the pattern can specify a genre of a video asset such that a match occurs whenever the user 30 initiates viewing of a video asset associated with the specified genre. If a match occurs, the associated video services usage event can be processed further to create an RI-myte, which then can be sent to the marketing information processing module 214. If no match occurs for any filter, then the video services usage event can be ignored.

The at least one marketing campaign identifier associated with a filter description can provide an indication of the marketing campaign (or other uses) to which the information can apply. When a video services usage matches a filter pattern, the RI-myte that is created can include the at least one marketing campaign identifier associated with the filter, so downstream elements can associate different RI-mytes with specific marketing campaigns (or other potential uses) for further processing.

A filter pattern specified in a filter description can take on a variety of forms. For example, filter patterns can include, but are not limited to, the following: exact string matches, partial string matches, case-sensitive or case-insensitive matches, wildcards, range matches, etc. For example, a filter description for a motion picture studio that wishes to identify users who may be interested in a new action-comedy genre movie can be specified as a campaign ID 7655432 with a filter pattern that includes full or partial VOD titles available in the same genre, action and/or comedy in the genre field of the VOD content, etc. As another example, a filter description for an automobile company can be specified as a campaign ID 5433210 with a filter pattern that includes full or partial VOD titles available that identify movies in which the company's automobiles are featured.

Block 260 also can occur in parallel with block 250 with the two processes influencing each other. For example, the information source module 210 can collect and send data related to the operation of the domain name resolution module 50, e.g., status, configuration, resource consumption, processing rate, match rates, etc., back to the marketing information management module 212 for use in refining the marketing campaign. Method 240 then can proceed to block 270.

In block 270, the marketing information processing module 214 can process the information supplied by the marketing information management module 212 and the information source module 210 to generate AMI and match it to marketing content. Block 270 can comprise a wide range of information processing activities including, but not limited to, matching, filtering, sorting, aggregating, accumulating, combining, de-referencing, etc. to generate AMI. Using that AMI, the marketing information processing module 214 can match marketing content from at least one marketing campaign with at least one TAM.

The marketing information processing module 214 can perform several types of operations to process the information supplied by the marketing information management module 212 and the information source module 210, including, but not limited to, the following: operations related to processing and managing receptiveness information, e.g., selecting and filtering receptiveness information, associating receptiveness information with a PAM, combining receptiveness information in various ways to improve its predictive value, aging receptiveness information over time as its relevance/predictive value wanes, etc.; operations related to creating and maintaining state and profile information for a PAM, e.g., combining new receptiveness information with old receptiveness information or previous state and profile information to compute new state and profile information, aging state and profile information over time as its relevance/predictive value wanes, storing state and profile information over time, retrieving state and profile information as needed to support other operations, etc.; operations related to processing and managing addressability information, e.g., expanding the addressability information associated with a PAM, updating and maintaining addressability information over time, etc.; operations related to selecting and maintaining target audiences, e.g., deciding whether a PAM should be a member of a target audience, maintaining and updating membership information over time, generating audience lists and supporting membership queries, etc.

Figure 6:
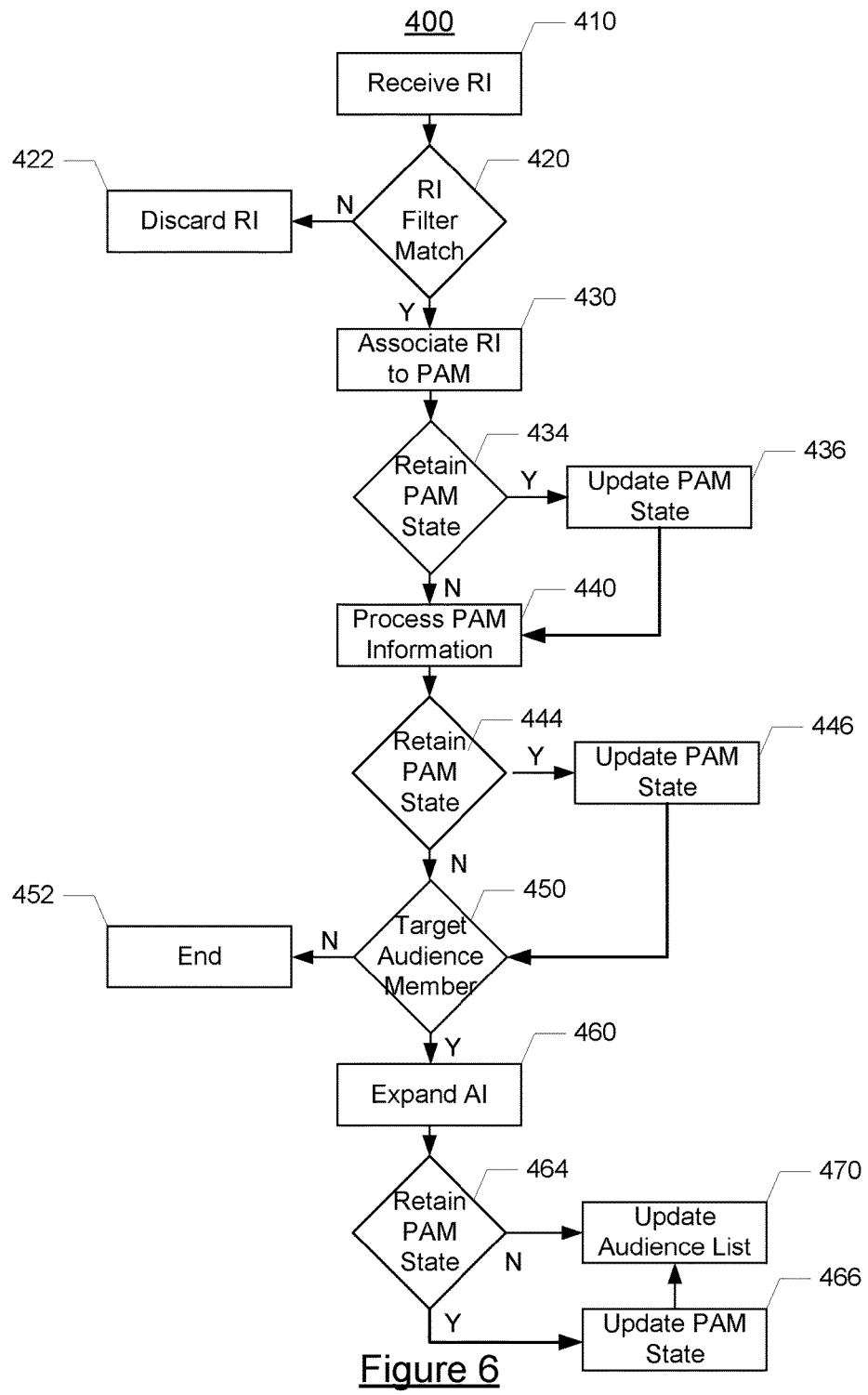
FIG. 6 is a flow chart of a method for implementing the information and decision processing functions of the marketing information processing module, according to an exemplary embodiment.

Referring to FIG. 6, a flowchart of a method for implementing the information and decision processing functions of the marketing information processing module, according to an exemplary embodiment, is illustrated. In block 410, the marketing information processing module 214 can receive receptiveness information from the information source module 210. Receptiveness information can be in the form of at least one RI-myte. The at least one RI-myte can be received in near-real-time. The at least one RI-myte can be received individually or in conjunction with other RI-mytes. Block 410 can involve receiving the at least one RI-myte, buffering, and possibly storing, the at least one RI-myte and making the at least one RI-myte available to subsequent stages. Method 400 then can proceed to block 420.

In block 420, the at least one RI-myte can be filtered and additional information can be associated with the at least one RI-myte, e.g., marketing campaign identifiers for marketing campaigns to which the at least one RI-myte could be relevant. A wide range of filtering operations can be employed. Filtering operations can be applied individually or in combination. Examples of possible filters can include, but is not limited to, the following: source IP address filters, video service type filters, zip code filters, opt-out filters, etc.

Source IP address filters can specify patterns for source IP addresses that can be contained in an RI-myte. Source IP address filters can be useful for a wide range of information. For example, source IP address filters can be used to limit the geographic scope of accepted receptiveness information because the service provider 40 can allocate IP addresses in a manner that allows contiguous ranges of IP addresses to be associated with specific geographic regions.

Video service type filters can specify patterns for types of video services that may be of interest. The type of video service being used by the user 30 can be useful because the type of video service being used can be used to detect user activity in various areas of interest.

Zip code filters can specify a pattern of zip codes that can be used to filter receptiveness information. Zip code filters can be useful for geographic filtering. Incoming RI-mytes can lack zip code information initially. Therefore, processing can be performed to expand the addressability information associated with the RI-myte before the zip code filter is applied. For example, the processing can include, but is not limited to the following steps: 1) using the IP address and timestamp to identify the user's IP access session; 2) associating the IP access session with the user's ID; 3) using the user's ID to access user account data containing the user's mailing address; and 4) extracting the zip-code from the mailing address and associating it with the RI-myte.

Opt-out filters can be used to detect and reject receptiveness information that pertains to users who do not wish to participate as PAMs in some or all of the marketing services. As with the zip code filters, before such filters can be applied, incoming receptiveness information can be expanded with additional 'opt-out' information by performing one or more information expansion operations in order to associate opt-out information with the RI-myte in question.

In addition to using filters to select or reject RI-mytes, filtering operations can, as a side effect, attach additional information to an RI-myte. For example, a filter can be associated with at least one specific marketing campaign and can attach this information to the RI-mytes that the filter matches in order to facilitate subsequent processing.

If the at least one RI-myte does not match any of the various filtering criteria, Method 400 then can proceed to block 422. In block 422, the at least one RI-myte can be discarded. If the at least one RI-myte matches at least one of the various filtering criteria, the at least one RI-myte can be retained, and Method 400 then can proceed to block 430.

In block 430, the at least one RI-myte can be associated with at least one PAM identifier. The at least one PAM can be contained in the at least one RI-myte. The at least one RI-myte can be associated with the at least one PAM identifier by combining and linking the information contained in the at least one RI-myte with other information available to the marketing information processing module 214.

For example, an RI-myte generated by recording data from video services usage can contain information including, but not limited to, the device ID of the source of the IP packet, a timestamp of the time at which the video services module 54 received the IP packet associated with the video services usage, the IP address of the source of the IP packet and information about the video service being requested. This information alone can be insufficient to associate the RI-myte with a specific user. However, the user's identity can be determined by linking the device ID contained in the RI-myte with additional information maintained in the service attachment module 46. The user's identity also can be determined by linking the source IP address and timestamp information contained in the RI-myte with additional information about the service provider's IP access sessions maintained in the network attachment module 48. Using this additional information, the IP access session ID and, if desired, the user ID can be associated with the RI-myte.

Multiple identifiers can be used to identify a PAM, including, but not limited to, an IP access session ID, a user ID, at least one device ID, a service-specific user ID, etc. The at least one RI-myte can contain a variety of information that can be used as input for linking the RI-myte to the at least one PAM identifier, including, but not limited to, an IP address, timestamp information, at least one device ID, a service-specific user ID, cookies, etc.

The information available to the marketing information processing module 214 for associating the at least one RI-myte with the at least one PAM identifier can be contained in various elements of the service provider's infrastructure. For example, an IP access session ID, a user ID, a unique IP address, timestamp information and unique access connection information all can be associated with each other in the network attachment module 48. The user ID and the unique access connection information also can be associated with each other, as well as with at least one service-specific user ID and at least one device ID, in the user account module 44. The at least one service-specific user ID and the at least one device ID also can be associated with each other, as well as with the unique IP address, the timestamp information and at least one HTTP cookie-based ID, in the other services module 52. Other associations can exist between identity information contained in the various modules.

By exploiting the associations between these various forms of identity information, the at least one RI-myte can be associated with the PAM who was involved in the at least one RI-myte's generation. These association operations can be applied in parallel and/or in sequence to expand the information associated with the at least one RI-myte. The information associated with the at least one RI-myte can be virtually limitless as long as the proper relational associations exist between the various pieces of information. Thus, an association operation can be used to associate at least one RI-myte with at least one PAM, as well as with other information, e.g., addressability information. Method 400 then can proceed to block 434.

In block 434, the marketing information processing module 214 can elect whether to retain information gathered about the status of at least one PAM for use in the future, for example, to establish a context for future campaign decisions. If the marketing information processing module 214 retains PAM state information, Method 400 can proceed to block 436. In block 436, the PAM state information can be updated. Method 400 then can proceed to block 440.

In block 440, the at least one RI-myte that has been associated with the at least one PAM can be combined and considered with any other information maintained with that at least one PAM. This combined information can be used in multiple ways, including, but not limited to, accumulating evidence in favor of a decision, performing a logical operation that leads to a decision, compressing the information into a more compact form, etc. For example, the combined information can be used to evaluate whether the at least one PAM should be included as a member or members of at least one target audience for at least one marketing campaign.

A wide range of information fusion and decision algorithms can be used, ranging from stateless triggers based on the occurrence of a single piece of receptiveness information to stateful algorithms that can be arbitrarily complex and highly intelligent. The output of these algorithms can be new receptiveness information that results from the combination of other pieces of information. This new receptiveness information can be processed further, used for decision making, stored as state for future processing or used to update profile information associated with a PAM, etc. The component pieces of information that are combined to create the new receptiveness information can come from the service provider's infrastructure or from external sources. The component pieces of information that are combined to create the new receptiveness information can originate at different points in time, from different sources or both.

A wide variety of combining operations can be used. For example, a numeric weight can be assigned to each piece of receptiveness information. Separate pieces of receptiveness information then can be combined through a simple mathematical operation, e.g., summation, weighted summation, etc. Such numerical methods can be useful to implement algorithms by which numeric thresholds can be used to make audience membership decisions. In another example, receptiveness information can be combined based on logical operations. Each piece of receptiveness information can be viewed as the occurrence of a proposition, which can be applied to an inference rule to reach a conclusion, e.g., a decision.

In addition to combining operations, aging operations can be used to reflect the fact that the predictive ability of information can wane over time. Therefore, aging operations can be used to age out the information over time. For example, a numeric temporal discounting algorithm can be applied whereby a piece of information is given progressively less value as it ages. Information can be maintained and considered for a fixed window of time only. Such temporal operations can be useful to detect and/or estimate levels of increased user activity in areas of interest.

The marketing information processing module 214 also can create and maintain persistent interest profiles for PAMs. For example, the marketing information processing module 214 can combine the at least one RI-myte that has been associated with the at least one PAM with other RI-mytes associated with the same at least one PAM to create, or update, at least one PAM profile. The new PAM profile can be stored, possibly in a PAM profile database. The marketing information processing module 214 also can perform periodic updates on the PAM profile without the arrival of new information associated with the PAM. For example, the marketing information processing module 214 can age the PAM profile information over time.

These PAM profiles can be persistent in the sense that the marketing information processing module 214 can maintain them over a period of time, and they can be unassociated with a single marketing campaign. By maintaining an interest profile per PAM, the marketing information processing module 214 can establish a form of persistent receptiveness information that can be a resource for making audience selection decisions.

These PAM profiles can encode a wide range of information about a PAM. For example, attributes that can be encoded in a PAM profile can include, but are not limited to, indicators related to various sports, hobbies, professions, financial matters, travel, generation/age, etc. The same information fusion techniques used to apply receptiveness information to individual marketing campaigns also can be applied to the creation and maintenance of PAM profiles.

Creating and maintaining PAM profiles can decouple, in time, the information collection and analysis process from the marketing campaign decision process. Thus, information collected over a period of time can be applied, at a later date, to a marketing campaign that had not yet been conceived at the time that the PAM profiles were initially created. The marketing information processing module 214 can use the PAM profile database as a source of information for selecting a target audience for a given marketing campaign. This selection process can be based on PAM profile information either alone or combined with other sources of receptiveness information.

All of the information available for the at least one PAM can be used to decide whether the at least one PAM is selected for membership in at least one target audience. The information used in the membership decision can include, but is not limited to the following: any receptiveness information that has been associated with the at least one PAM and has survived filtering and processing; any information encoded in the profile of the at least one PAM; any addressability information associated with the PAM, especially those forms of addressability information that can be used by the target marketing campaign; any information about the marketing campaign to which the target audience applies, including, but not limited to, specification of a selection/decision algorithm and associated parameters, e.g., thresholds, time-frames, etc, any intrinsic value (financial or otherwise) associated with the campaign, execution status, such as the actual versus desired number of messages delivered, etc.; any other PAM-related information, including, but not limited to, information about acceptable levels of exposure to marketing messages, either at a per campaign or aggregate level, information about other campaigns to which the PAM can be a audience member and their associated intrinsic values, information about a PAM's willingness to participate, e.g., opt-in/opt-out information, etc.

A wide range of algorithms can be devised to implement the selection operation. For example, an algorithm can determine whether a PAM should be included in a target audience for a given marketing campaign approach based on calculating a numeric score that weights individual pieces of relevant receptiveness information. $RI_i$ can be used to denote a piece of relevant receptiveness information received at time i. $W(RI_i)$ can be used to indicate a weight or numeric value that provides an indication of the extent to which $RI_i$ predicts the likely PAM's receptiveness to the marketing campaign. $W(RI_i)$ values can be positive, indicating increased receptiveness, or negative, indicating decreased receptiveness.

A selection algorithm can be devised whereby a temporally discounted summation of receptiveness information accumulated over time can be computed. $TV(t)$ can be a total value estimate of the receptiveness of a given PAM to a given marketing campaign at time t. $TV(t)$ can be defined as follows: $TV(t) = SUM(W((RI_i) * \gamma^{(t-i)})$, where the sum can be computed over all available accumulated receptiveness information and $\gamma$ can be a temporal discounting factor between 0 and 1. A PAM can be considered a candidate for membership in an audience if, at any point in time, the value of $TV(t)$ exceeds a set threshold. Otherwise, the PAM can be rejected as a candidate for membership in the audience. $TV(t)$ can be computed when new information becomes available and/or periodically to allow for information aging to discount the metric. If sufficient evidence of receptiveness is accumulated in a sufficiently short period of time, the PAM will be considered a candidate for the target audience.

$TV(t)$ can account for receptiveness without accounting for other factors, including, but not limited to, addressability, exposure control, competing campaigns etc. To account for these other factors, the decision algorithm can be extended with other logic. For example, before adding a PAM to a target audience the decision algorithm can verify that the addressability information used by the target campaign, e.g., mailing address, is available for the PAM. If the addressability information is not available, the PAM can be rejected. For exposure control, the algorithm can reject the PAM if the number of times the PAM or has been selected for a target audience over a given timeframe exceeds a certain threshold. To account for competing campaigns, the selection algorithm can compare the intrinsic values associated with each competing campaign and add the PAM to the campaign with the highest value first. By combining a series of logical and numeric computations, the algorithm can make audience membership decisions relatively efficiently.

Once a PAM is selected for a target audience, the marketing information processing module 214 can maintain that selection decision and adjust it over time. Multiple factors can affect the status of a PAM with respect to a given target audience over time, including, but not limited to, the following: the arrival of new receptiveness information; the aging of receptiveness information over time; changes in the PAM's addressability information; changes in the target campaign itself, such as expiration; changes if the status of the PAM identity, such as where the PAM is identified by an IP access session ID that subsequently is terminated. Algorithms for detecting these factors and updating the membership status of a PAM in response thereto can be devised as long as the marketing information processing module 214 has notification and/or query support from the other modules in System 200. Method 400 then can proceed to block 444.

In block 444, the marketing information processing module 214 can elect whether to retain information gathered about the status of at least one PAM for use in the future. If the marketing information processing module 214 retains PAM state information, Method 400 can proceed to block 446. In block 446, the PAM state information can be updated. Method 400 then can proceed to block 450.

In block 450, the marketing information processing module 214 can decide whether to include the at least one PAM as a member or members of at least one target audience for at least one marketing campaign If the at least one PAM is not included as a member or members of at least one target audience for at least one marketing campaign, Method 400 can proceed to block 452, where Method 400 can end. If the at least one PAM is included as a member or members of at least one target audience for at least one marketing campaign, Method 400 can proceed to block 460.

In block 460, the addressability information associated with the at least one PAM can be expanded so marketing content associated with the marketing campaign can be sent to the PAM. The marketing information processing module 214 can use addressability information to act on a marketing decision. The marketing information processing module 214 can have access to a wide range of addressability information, including, but not limited to, a user's IP address, e-mail addresses, postal addresses, telephone numbers, device IDs, various service-specific user IDs, etc. Addressability information can be part of a PAM identifier, e.g., where the PAM can be identified by a unique identifier which itself serves as addressability info, such as an e-mail address. Depending upon the at least one target campaign and its at least one associated distribution channel, different addressability information can be added.

To obtain addressability information, information associated with the PAM can be linked with information available in the information source module 210. Addressability information expansion operations can be implemented using the same relational association techniques previously described for associating receptiveness information with a PAM. In other words, addressability information can be associated with a PAM or a piece of receptiveness information by following a chain of relational associations, whereby unique keying information can be used to identify the relevant unit of information For example, an IP access session ID can be a unique PAM identifier. To expand the addressability information associated with the PAM, the marketing information processing module 214 can use the IP access session ID as an index key to lookup information about the PAM's IP access session in the network attachment module 48. The information obtained in the lookup operation can include the associated user ID. The user ID, in turn, can be used as a index key to retrieve information about the user's account from the user account module 44. The information in the user account module 44 can contain the desired addressability information, e.g., e-mail addresses, postal address, phone number, etc. In this way, PAM information can be expanded to include additional addressability information so the desired marketing content can be sent through the desired distribution channel.

In addition to expanding the addressability information associated with a PAM, the marketing information processing module 214 can actively manage the association and respond to information changes. Such active management can be important where the addressability information can be volatile. For example, if the user's IP address is being used as the primary source of addressability, then changes in the user's IP address can be reflected in the addressability information associated with the user 30.

Multiple approaches can be used to manage the relationship between a PAM and it's addressability information. The information source module 210 can notify the marketing information processing module 214 upon detecting any change in the addressability information. For example, the network attachment module 48 can notify the marketing information processing module 214 when the user's IP access session terminates, so that any associated addressability information can be updated. The marketing information processing module 214 can attempt to verify the addressability information by querying the information source module 210 just before using the addressability information. The marketing information processing module 214 can defer expanding addressability information until the specific addressability information will be used to send marketing content. Method 400 then can proceed to block 464.

In block 464, the marketing information processing module 214 can elect whether to retain information gathered about the status of at least one PAM for use in the future. If the marketing information processing module 214 retains PAM state information, Method 400 can proceed to block 466. In block 466, the PAM state information can be updated. Method 400 then can proceed to block 470.

In block 470, information about the target audience for at least one marketing campaign can be updated. Target audience lists can be generated that can be used to drive on-demand marketing channels, e.g., direct mail, e-mail, telemarketing, etc. Procedures for generating these target audience lists can vary. Lists of TAMs can be produced in periodic batches or incrementally as new members are added. The information contained in each target audience list can vary by campaign and by the distribution channel used.

Audience membership information can be stored in a database and maintained within the marketing information processing module 214 over time. The database can be an audience membership database. The marketing information processing module 214 can expose interfaces by which other components, e.g., the distribution channel module 216, can query the marketing information processing module 214 to obtain audience membership information. This capability can be used to send marketing content on an opportunistic basis in those instances where the delivery of marketing content to a TAM can only occur when an opportunity arises. The opportunistic distribution channel can query the marketing information processing module 214 in near-real-time when a marketing opportunity becomes, or is about to become, available. For example, the query can include information that can be used to identify a TAM. This information can be used by the marketing information processing module 214 to lookup stored audience membership information for the TAM and return it to the distribution channel module 216, which, in turn, can use the audience membership information to select and send marketing content.

The query interface supported by the audience membership database can support a wide range of search capabilities and support audience queries based on a wide range of information. This information can include, but is not limited to, the following: IP address and timestamp, e.g., the current time, as a means for looking up a TAM based on IP address and, by association, IP access session ID; device ID, e.g., to identify a TAM via associated device ID; service-specific user ID, e.g., to identify a TAM via associated service-specific user ID; IP access session ID; user ID; e-mail address; geographic information, e.g, to identify a group of TAMs in a given geographic region; campaign ID information, e.g., to specify the target audience of interest.

For example, the marketing information processing module 214 can receive a variety of information that causes the marketing information processing module 214 to assign the PAM to a particular marketing campaign, thus making the PAM a TAM for that campaign. The marketing information processing module 214 can store the TAM information in the audience membership database. The distribution channel module 216 can use the audience membership database to send marketing content messages via an opportunistic distribution channel by querying the database when a marketing opportunity becomes available. The query can include information that can be used to identify the PAM associated with the opportunity, e.g., an IP address. The audience membership database can processes the query and send a response, which can include information about marketing campaigns for which the PAM is a TAM. Upon receiving the response, the distribution channel module 216 can choose appropriate marketing content, e.g., content associated with the selected marketing campaign, if any, and send the content to the TAM through the distribution channel. Usage information about the PAM also can be fed back into the marketing information processing module 214 by the distribution channel module 216 to aid in controlling exposure.

The audience membership database can be used for purposes other than servicing opportunistic distribution channel functions. For example, the audience membership database can be queried by an outside entity to generate an on-demand audience membership list.

Returning to FIG. 4, after the marketing information processing module 214 has processed the information supplied by the marketing information management module 212 and the information source module 210 to generate AMI and match it to marketing content, Method 240 then can proceed to block 280.

In block 280, marketing content can be sent to at least one TAM by the distribution channel module 216. The distribution channel module 216 can make use of multiple distribution channels as part of an end-to-end service provider-based TMS system. These distribution channels can include, but are not limited to, the following: direct mail distribution, e-mail distribution, telemarketing, web-based advertising insertion, IP-transport-based interstitial advertisement insertion, IP-based video service advertisement insertion. These distribution channels can be used individually or in combination in the context of a service provider-based TMS system.

These distribution channels can be categorized as on-demand or opportunistic. Marketing content can be sent to a TAM through an on-demand distribution channel at any time, once the TAM has been identified and sufficient addressability information has been obtained. On-demand distribution channels can include, but are not limited to, direct mail distribution, e-mail distribution, telemarketing, certain forms of video service advertisement insertion, etc.

For on-demand distribution, the distribution channel module 216 can contain a marketing content database that can contain marketing content. The distribution channel module 216 can receive at least one TAM list generated by the marketing information processing module 214 that contains information for at least one TAM. Specifically, the at least one TAM list can contain addressability and marketing campaign information for the at least one TAM. The distribution channel module 216 can combine the information in the at least one TAM list with information from the marketing content database to send marketing content to the at least one TAM. The content and form of the marketing content and the methods used to deliver the content can vary. The delivery of the content can be in near-real-time relative to the arrival time of the at least one TAM list from the marketing information processing module 214 or the timing of the delivery can be decoupled from the arrival of the at least one TAM list.

Once the distribution channel module 216 sends the marketing content to the at least one TAM, the distribution channel module 216 can provide feedback, in the form of exposure reporting, to the marketing information processing module 214. This feedback can be used by the marketing information processing module 214 to influence future audience membership decisions.

Direct mail distribution can involve sending marketing content to at least one TAM via the postal service or a private package carrier. Direct mail can be an on-demand distribution channel, in that, once selection and address information are available, marketing content can be sent to the TAM at any time. The addressability information used for direct mail distribution can be a postal address, which can be PII. The service provider 40 can obtain the postal address from the user account module 44. Automated direct mail distribution systems are well known in the art and can be created without resources unique to a service provider 40.

Telemarketing can involve sending marketing content to at least one TAM via telephone calls made to the TAM. Marketing content can be sent via automated systems, human operators or a combination thereof. Telemarketing can be an on-demand distribution channel, in that, once selection and address information are available, marketing content can be sent to the TAM at any time. The addressability information used for telemarketing can be a telephone number, which can be PII. The service provider 40 can obtain the telephone number from the user account module 44. Telemarketing systems are well known in the art and can be created without resources unique to a service provider 40.

E-mail distribution can involve sending marketing content to at least one TAM via electronic mailing systems, including those accessible through the Internet. Marketing content can be sent as individual e-mail messages and/or can be embedded in other e-mail-based content, such as e-mail-based newsletters. E-mail distribution can be an on-demand distribution channel, in that, once selection and address information are available, marketing content can be sent to the TAM at any time. The addressability information used for e-mail distribution is an e-mail address for the TAM, which can be PII. The service provider 40 can obtain the e-mail address from the user account module 44 and/or from user profile database associated with the other services module 52. E-mail distribution systems are well known in the art and can be created without resources unique to a service provider 40. However, the service provider 40 can be able to leverage its existing e-mail distribution system for delivering marketing content.

Marketing content can be sent to a TAM through an opportunistic distribution channel only when an opportunity arises. Opportunistic distribution channels can include, but are not limited to, web advertisement insertion, IP-transport-based interstitial advertisement insertion, certain forms of video service advertisement insertion, etc. Content distribution opportunities can arise based on the activities of the TAM, e.g., during the course of a web-browsing session to a specific web site. Thus, the distribution channel module 216 can initiate an interaction with the marketing information processing module 214 to request information about how best to respond to an available marketing opportunity.

Figure 7:
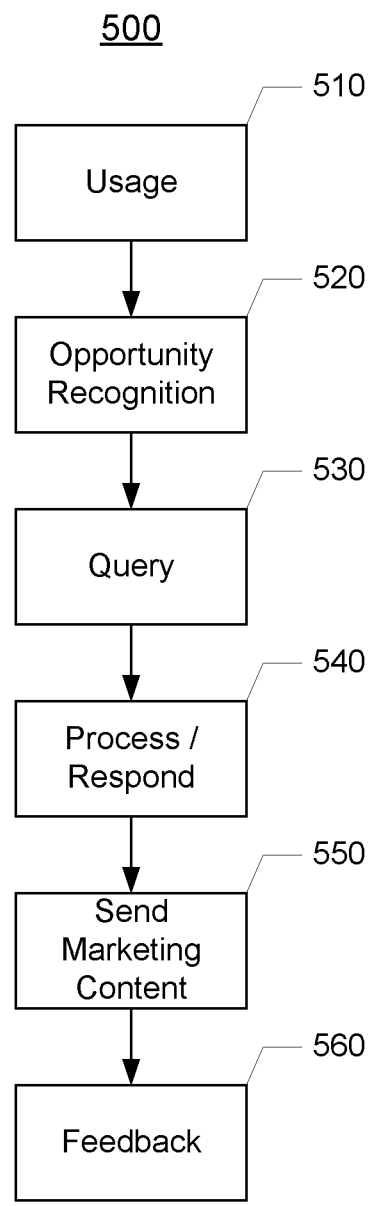
FIG. 7 is a flow chart of a method for opportunistic distribution of marketing content, according to an exemplary embodiment.

Referring to FIG. 7, a flow chart of a method for opportunistic distribution of marketing content, according to an exemplary embodiment, is illustrated. In block 510, a PAM, using the user interface module 32, can interact with an IP-based service, including, but not limited to, IP-transport services, web-based services, IP-based video-on-demand services, etc. For example, the PAM can use a PC and other home networking devices to interact with a web-based content server to view a web page or use a set-top-box and other home networking devices to interact with an IP-based video service to purchase and view a movie. Method 500 then can proceed to block 520.

In block 520, the service provider 40 can detect an opportunity to deliver marketing content during the course of service delivery. The service provider 40 then can notify the distribution channel module 216 that the opportunity exists. The information conveyed in the notification can include sufficient information to identify the PAM, e.g. an IP address and timestamp associated with the PAM and/or the PAM's user interface module 32, a device ID, a service-specific user ID, etc. Method 500 then can proceed to block 530.

In block 530, the distribution channel module 216 can query the marketing information processing module 214 to request information about available marketing campaigns for which the PAM in question can be a TAM. The information in the query can be sufficient to identify the PAM. The query also can contain information that can influence the decision of the marketing information processing module 214. Method 500 then can proceed to block 540.

In block 540, the marketing information processing module 214 can perform near-real-time processing to determine which marketing campaign, if any, should be applied to the marketing content delivery opportunity. This processing can include accessing an audience membership database. The marketing information processing module 214 then can send a response to the distribution channel module 216, identifying the marketing campaign, at which point the PAM can become a TAM. Method 500 then can proceed to block 550.

In block 550, the distribution channel module 216 can retrieve the identified marketing content from a marketing content database and send it to the user interface module 32 being used by the TAM for service usage. Method 500 then can proceed to block 560.

In block 560, the distribution channel module 216 can send feedback, in the form of exposure reporting, to the marketing information processing module 214. This feedback can be used by the marketing information processing module 214 to influence future audience membership decisions.

Web advertisement insertion can involve inserting marketing content into the content delivered to at least one TAM as the at least one TAM browses one or more websites. For example, a PAM can visit a website associated with a TMS system that can have web advertisement insertion capabilities. Information that can be used to identify the user can be collected via a variety of means. This information then can be used, possibly in combination with other information collected during the browsing process, to select marketing content to deliver to the PAM, making the PAM a TAM. The marketing content can be incorporated into the content provided by the website and sent to the TAM. The type and form of marketing content sent to the TAM can vary widely and can be limited only to the extent that the marketing content can be incorporated into HTTP sent content. For example, marketing content can be rendered as a banner advertisement image embedded in the body of an HTML page, as a complex multimedia application sent via HTTP to the TAM, etc.

Web advertisement insertion can be an opportunistic distribution channel, in that, marketing content cannot be sent to the TAM at any time; marketing content can only be sent to the TAM when the TAM is visiting a website associated with a TMS system that can have web advertisement insertion capabilities. These websites can be internal, e.g., owned and operated by the service provider 40, or external, e.g., affiliated, but not owned and operated by the service provider 40.

The addressability information used for web advertisement insertion can vary. Information embedded in HTTP cookies can be used to identify the PAM through a user identifier embedded in the cookie that indicates a unique web-browsing session ID, the identity of a user account that can be associated with the website, etc. as is well known in the art. For a service provider-based TMS system, cookie-based approaches to identifying PAMs can be used, so long as the information encoded in the cookie can be linked through information relationships back to a PAM.

However, an alternative approach is also available. The PAM's IP address and timestamp can be used as a key for dynamically identifying the PAM as previously discussed. The website, in addition to collecting any other relevant decision information, can provide the TMS system with the source IP address and timestamp associated with the PAM's HTTP request. The source IP address and timestamp, in turn, can be used to identify the PAM using the unique information resources available to the service provider 40. For example, the IP address and timestamp of the request can be used to associate the request with the PAM's IP access session via information maintained in the network attachment module 48. The IP access session can specify the PAM or can be linked back further to a user ID via information maintained in the network attachment module 48 or the user account module 44, which can specify the PAM, or can be linked back further to other types of identifiers, e.g., device ID, service-specific user ID, etc., which can specify the PAM.

This alternative approach can be used without the website delivering a timestamp to the TMS system because it can be implicitly inferred to be the time that the IP address is delivered. The time that the IP address is delivered can be used because, in opportunistic distribution channels, the identification and marketing campaign decision processing occurs in near-real, time.

The HTTP cookie-based web advertisement insertion approaches are well known in the art and can be performed without resources unique to the service provider 40. The IP address-based web advertisement insertion approach, on the other hand, can use resources unique to the service provider 40.

Transport-based advertisement insertion can involve using service provider transport resources associated with the IP packet transport module 42, e.g., routers, proxies, gateways, etc., to dynamically insert marketing content in the service content exchanged between the user 30 and the service provider 40. The marketing content can be inserted in the packets that flow between the user 30 and a service entity, e.g., website, as the packets traverse the IP packet transport module 42. To support this capability, elements of the IP packet transport module 42 can be extended to support the distribution channel module 216. A variety of technologies, well known in the art, can enable these extended capabilities including, but not limited to, deep-packet inspection devices, proxies, service gateways, etc.

For example, the IP packet transport module 42 can modify the information content in an HTTP response delivered from a web server to the user 30. That modification can be to insert marketing content into the HTTP content sent by the web server.

Transport-based advertisement insertion can be an opportunistic distribution channel, in that, marketing content cannot be sent to the TAM at any time; marketing content can only be sent to the TAM during opportunities provided by the TAM via network usage activity.

The addressability information used for transport-based advertisement insertion can vary and can depend on the service being used. For example, the TAM's IP address and timestamp can identify the PAM, in a manner similar to that previously described for the web advertisement insertion distribution channel. This approach can be particularly useful for transport-based advertisement insertion because the IP address and timestamp can be extracted from the underlying packet flow being manipulated. Other addressability/ identity information also can be used. For example, the IP packet transport module 42 can look deeper, e.g., above open systems interconnection (OSI) layer 4, into the packet flow between the user 30 and the service provider 40 to extract HTTP cookies, service user IDs, device IDs, etc. that can be linked back to a PAM via information available in a service provider-based TMS system.

Referring back to Method 500, the IP packet transport module 42 can enable the interaction between the PAM and the IP-based service in block 510 by transporting the IP packets between the PAM and the IP-based service. Elements of the IP packet transport module 42 can detect service usage as packets traverse the service provider's infrastructure, detect an opportunity to deliver marketing content and convey this information to other elements of the distribution channel module 216 in block 520. Method 500 then can proceed as described to block 550, where elements of the distribution channel module 216 can retrieve an interstitial advertisement from the marketing message database and send that interstitial advertisement to elements of the IP packet transport module 42, which are also elements of the distribution channel module 216, for insertion into the packet stream heading back to the TAM. Method 500 then can proceed as described to block 560.

Transport-based advertisement insertion can be used with multiple end-services, including, but not limited to, web/HTTP-based services, IP-based video services, etc. When used with HTTP-based services, the IP packet transport module 42 can modify the content of the HTTP response packets sent back to the TAM from an end-services web server.

Transport-based advertisement insertion can be used to insert marketing content in the content stream associated with an end-service provider, without explicit interaction with, or even knowledge and consent of, the end-service provider. Thus, transport-based advertisement insertion can be applied to both services that are internal and external to the service provider 40, including unaffiliated providers of external services.

Transport-based advertisement insertion also can be implemented by installing elements of the distribution channel module 216 in the user interface module 32, rather than in the IP packet transport module 42. Using this implementation, marketing content can be sent to a client device, e.g., a set-top box, in advance for insertion based on available opportunities. This approach can be considered opportunistic, on-demand or a hybrid of an on-demand/opportunistic distribution channel. The approach can be considered opportunistic in the sense that marketing content can be delivered only when the TAM uses the service. The approach can be considered on-demand in the sense that a TMS system can send the content to the client device any time and the content will, most likely, be sent to the TAM at some point, assuming that the TAM uses the service on a regular basis.

One type of video service advertisement insertion, referred to as client-side video advertisement insertion can function in this same hybrid manner. In client-side video advertisement insertion, marketing content can be sent to and stored on the service user's video terminal device, e.g., a set-top box, in advance and spliced into the user's video stream on the video terminal device as opportunities arise during video-service play-out. Client-side video advertisement insertion can be used to send marketing content for video-on-demand services as well as for linear-scheduled video services, e.g., broadcast television. Client-side video advertisement insertion also can be applied to video streams that have been prerecorded on the video terminal device for play-out at a later time, e.g., video streams recorded by a digital video recorder.

Client-side video advertisement insertion can be applied to video services that are not based on IP-transport. For example, if the video terminal device has tuning, decoding and media splicing capabilities, marketing content delivered via this type of IP-based distribution channel can be spliced into a media stream coming from a traditional radio frequency digital cable service, e.g., quadrature amplitude modulation-based, or from an over-the-air digital video service, e.g., Advanced Television Systems Committee-based.

The addressability/identification information used by client-side video advertisement insertion can vary. The video terminal device, and thus the TAM, can be addressed by an IP address and a timestamp, a device ID, a service-specific user ID or other identifying information. The selection of addressability/identification information can depend on the different characteristics of these different options. For example, the use of an IP address and timestamp to identify the TAM can be selected where the service provider 40 wishes to operate the marketing service in an anonymous manner. Where anonymity is not an objective, the use of other identifiers can be more convenient.

Figure 8:
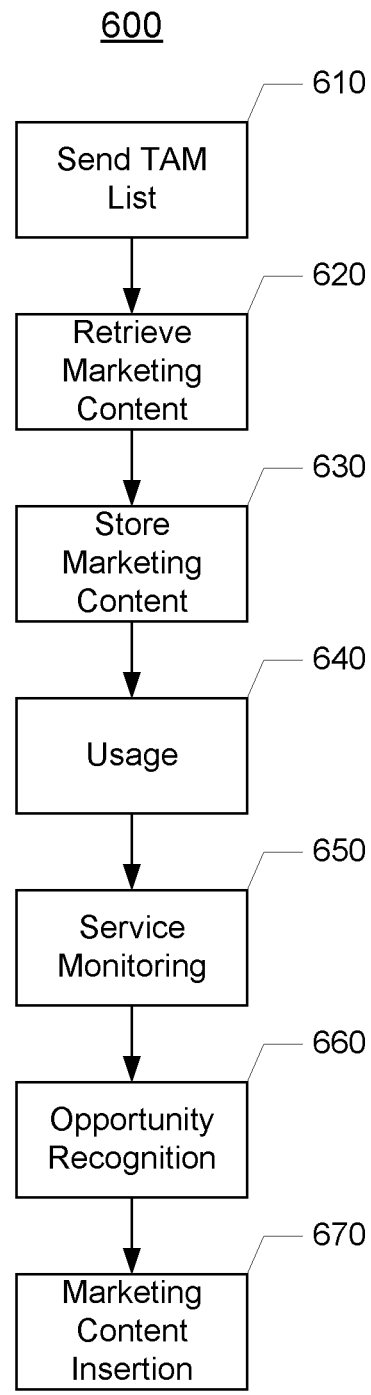
FIG. 8 is a flow chart of a method for hybrid distribution of marketing content, according to an exemplary embodiment.

Referring to FIG. 8, a flow chart of a method for hybrid distribution of marketing content, according to an exemplary embodiment, is illustrated. In block 610, the marketing information processing module 214 can send at least one TAM list to elements of the distribution channel module 216 located in the service provider's infrastructure. The at least one TAM list can associate at least one targeted marketing campaign to at least one TAM and the TAM's associated addressability/identity information. Method 600 then can proceed to block 620.

In block 620, the elements of the distribution channel module 216 located in the service provider's infrastructure can retrieve the marketing content associated with the at least one targeted marketing campaign and send it to elements of the distribution channel module 216 located in the user interface module 32, e.g., the user's video terminal device. This marketing content can be appropriate for the TAM associated with the user interface module 32 as determined by addressability information associated with the user interface module 32. The elements of the distribution channel module 216 located in the service provider's infrastructure also can send control data to the elements of the distribution channel module 216 located in the user interface module 32 that can specify under what conditions the marketing content can be sent to the TAM. This control information can specify marketing information processing module-like policy information about the applicability of different marketing content to different potential opportunities that can arise on the user interface module 32. Method 600 then can proceed to block 630.

In block 630, the elements of the distribution channel module 216 located in the user interface module 32 can store the marketing content in a local cache. Storing the marketing content can prepare the elements of the distribution channel module 216 located in the user interface module 32 to begin operation in an opportunistic mode. Method 600 then can proceed to block 640.

In block 640, the TAM can begin interacting with the user interface module 32 to receive services, e.g., begin a video-on-demand session, view broadcast television, etc. Method 600 then can proceed to block 650.

In block 650, the elements of the distribution channel module 216 located in the user interface module 32 can monitor the service, e.g., a video stream being rendered, and detect opportunities to insert marketing content therein. For example, the elements of the distribution channel module 216 located in the user interface module 32 can be able to detect cue tones or other signals embedded in a video stream originating from the other services module 52. Method 600 then can proceed to block 660.

In block 660, the elements of the distribution channel module 216 located in the user interface module 32 can detect an advertisement insertion opportunity, evaluate the opportunity and retrieve appropriate marketing content from the local cache. The evaluation of the advertisement insertion opportunity can be based on locally-cached policy information. Method 600 then can proceed to block 670.

In block 670, the marketing content can be inserted into the content being consumed by the TAM, e.g., spliced into the video stream and sent to the TAM.

Another type of video service advertisement insertion, referred to as video-on-demand (VOD) advertisement insertion can apply to VOD services and can function in an opportunistic manner. VOD advertisement insertion can involve splicing targeted marketing content into the video stream, at an advertisement insertion opportunity, as the video stream is sent to the TAM during a VOD service. VOD advertisement insertion can be an opportunistic distribution channel, in that marketing content can only be sent to the TAM when the TAM interacts with the VOD service to order and playback video content, e.g., a movie. When the TAM interacts with the VOD service to order and playback video content, targeted marketing content, e.g., advertisements, can be spliced into the video content being sent to the TAM.

The addressability information used by a VOD advertisement insertion distribution channel can vary. For example, the source IP address and timestamp associated with the VOD session can be used as a key to identify/address the underlying TAM. Other forms of TAM identifying information also can be used, including, but not limited to, a device ID, a unique service-level user ID, etc. The techniques used by the VOD advertisement insertion distribution channel to identify the TAM by linking provided keying information with other relational information contained in various service provider resources, e.g., the network attachment module 48, user account module 44, other services module 52, etc. can be similar to those previously described for the web-based advertisement insertion distribution channel.

Referring back to Method 500, for VOD advertisement insertion, the interaction between the PAM and the IP-based service in block 510 can be the PAM interacting with the other services module 52 to browse, select and initiate a VOD session, e.g., by using RTSP. This activity can trigger the detection, in block 520, of at least one marketing content insertion opportunity associated with the VOD media that is to be sent to the PAM. Method 500 then can proceed as previously described to block 550, where the distribution channel module 216 can splice the marketing content into the VOD media content stream before sending the media content stream to the TAM. The splicing function used to merge the marketing content with the VOD media content can involve cue tones, or other signals, embedded in VOD media content to detect insertion points and is well known in the art. Method 500 then can proceed as previously described to block 560.

VOD advertisement insertion can use different strategies for signaling and determining the marketing content associated with a VOD session. For example, a single insertion opportunity can be detected and indicated during the initial VOD session negotiation and the distribution channel module 216 can send multiple advertisements for insertion for the duration of the session. Opportunity indications also can be signaled as they arise in the stream.

VOD advertisement insertion techniques also can be applied to other forms of media on demand, such as audio media, e.g., music-on-demand.

Returning to FIG. 4, after the marketing content has been sent to at least one TAM by the distribution channel module 216, Method 240 then can proceed to block 290.

In block 290, the performance analysis module 218 can collect and analyze feedback relating to the performance of at least one marketing campaign. This analysis can include generation of information, e.g., a performance report, that can be delivered to the marketing campaign sponsor through the marketing information management module 212. The results of the analysis also can be delivered to the marketing information management module 212 for use in adjusting the marketing campaign definition in order to improve performance. Method 240 then can proceed to block 250 for redefinition of the marketing campaign.

Figure 9:
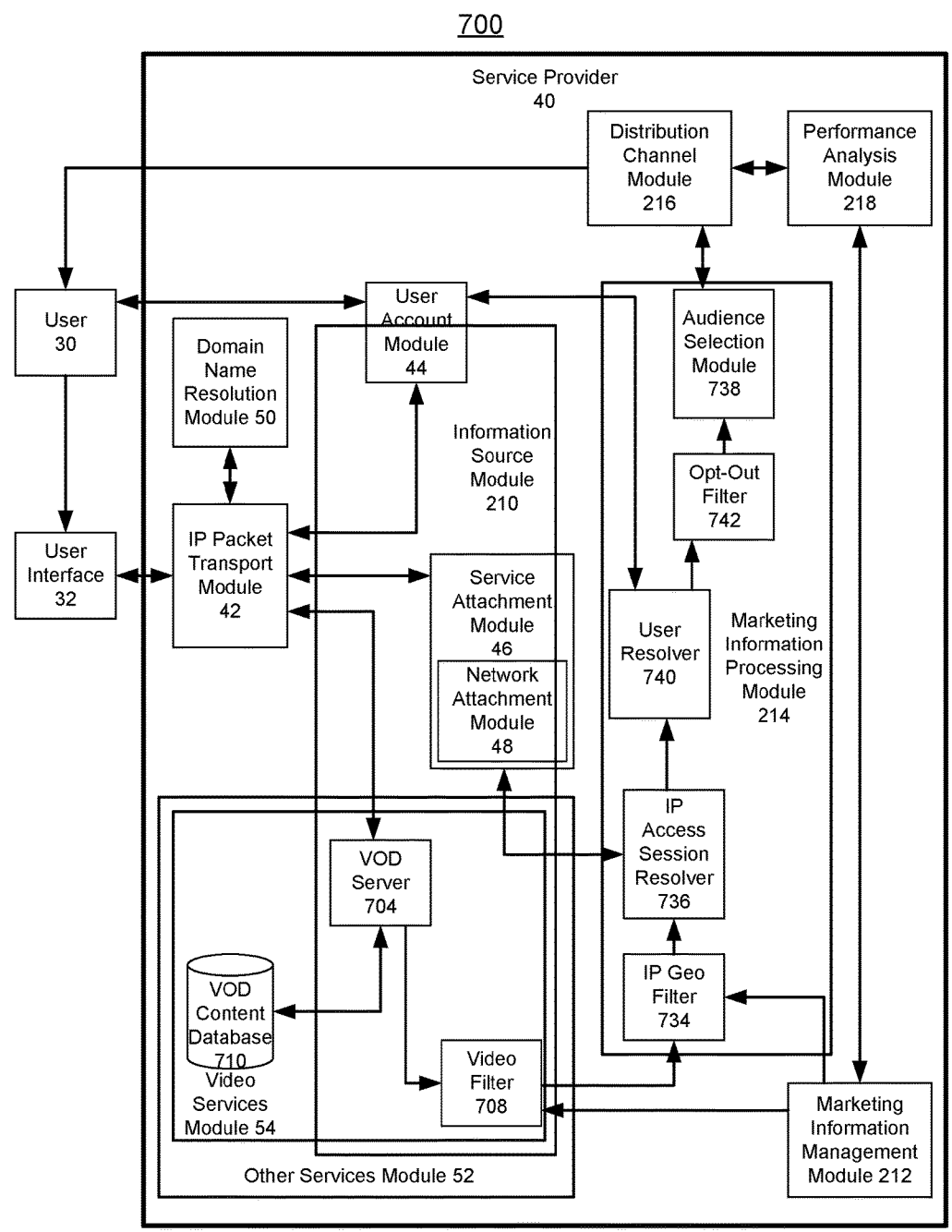
FIG. 9 is a schematic diagram of a service provider-based targeted marketing services system, according to an exemplary embodiment.

Referring to FIG. 9, a schematic diagram of a service provider-based targeted marketing services system, according to an exemplary embodiment, is illustrated. FIG. 9 illustrates an example of a service provider-based targeted marketing services system and contains the technology infrastructure that can be used by the service provider 40 to leverage the video services module 54, the user account module 34 and the network attachment module 48 as information sources to gain insight into the user's video services usage activities, obtain addressability information and use that information to send targeted marketing content to the user 30 via a direct mail distribution channel. A service provider-based TMS system can include other technology infrastructure used to leverage other information sources based on other activities and used to deliver marketing content to the user 30 via other distribution channels. System 700 can comprise a user 30, a user interface module 32 and a service provider 40.

The user 30 and the user interface module 32 can be as described for System 20. The user 30 can be an individual or group that uses IP-based services provided by and through the service provider 40. The user interface module 32 can provide a means for the user 30 to couple at least one input and/or output device to the service provider's infrastructure via an IP-enabled communications link and to interact with IP-based services via the coupled device(s).

The service provider 40 can comprise an IP packet transport module 42, a user account module 44, a service attachment module 46, a network attachment module 48, a domain name resolution module 50, an other services module 52, an information source module 210, a marketing information management module 212, a marketing information processing module 214, a distribution channel module 216 and a performance analysis module 218. The IP packet transport module 42, user account module 44, service attachment module 46, network attachment module 48, domain name resolution module 50, and other services module 52 can be as described for System 20. The IP packet transport module 42 can route and forward IP packets to and from the user interface module 32. The user account module 44 can manage the information related to a user's account with the service provider 40 and associated service provisioning information. The service attachment module 46 can dynamically exchange service provisioning and configuration information with the user interface module 32. The network attachment module 48 can coordinate the dynamic provisioning and configuration associated with providing the user 30 with IP-transport services. The domain name resolution module 50 can provide domain name resolution services via the DNS. The other services module 52 can manage the delivery of other services provided by the service provider 40.

The other services module 52 can include a video services module 54. The video services module 54 can be as described for System 20. The video services module 54 can comprise that portion of the other services module 52 associated with supplying video services.

In addition, the video services module 54 can include a video server 704, a video filter 708 and a VOD content database 210. The IP packets sent to the VOD server 704 can be processed to send VOD content available in the VOD content database 710 back to the user interface 32 through the IP packet transport module 42. The video server 704 also can detect IP packets containing video services usage of interest and record relevant data about those IP packets.

The relevant data can include, but is not limited to, the source device ID of the IP packet, the source IP address of the packet, a timestamp of the time the IP packet was received, the destination IP address of the packet, information about the video service requested, etc. and constitutes RI-mytes. The video filter 708 can receive the RI-mytes from the video server 704 and filter them. Those RI-mytes that match at least one target pattern can be retained, while those RI-mytes that do not match at least one target pattern can be discarded. A large percentage of RI-mytes can be discarded by the video filter 708. The video filter 708 also can tag retained RI-mytes with additional campaign information, e.g., a marketing campaign ID, or other use indicator, that can be used by the marketing information processing module 214 to establish processing context and determine proper handling. Information contained in the RI-mytes retained by the video filter 708 can include, but is not limited to, an indicator of the type of RI-myte, e.g., a video services usage-based myte, the source IP address of the IP packet, the video service requested, associated pattern matched information, the time of the request, a list of at least one marketing campaign or other use indicators to which the RI-myte applies, etc.

The management and configuration of the filters applied by the video filter 708, as well as the marketing campaign ID or other use indicator used by the video filter 708 to tag RI-mytes, can be provided by the marketing information management module 212.

The information source module 210, marketing information management module 212, marketing information processing module 214, distribution channel module 216 and performance analysis module 218 can be as described for System 200. The information source module 210 can collect information and forward that information to the marketing information processing module 214. The marketing information management module 212 can manage the configuration of and control the information associated with at least one marketing campaign being conducted by a TMS. The marketing information processing module 214 can combine individual units of receptiveness information, addressability information and AMI to improve the quality of AMI and generate new AMI. The distribution channel module 216 can send marketing content once the marketing information processing module 214 combines AMI with marketing content from the marketing information management module 212. The distribution channel module 216 also can inform the audience selection module 738 and the performance analysis module 218, that the marketing content has been sent to the user 30. The performance analysis module 218 can receive information from the marketing information management module 212 and the distribution channel module 216 to measure the effectiveness of at least one marketing campaign. The performance analysis module 218 also can send the effectiveness measurement to the marketing information management module 212.

As previously described, the information source module 210 can include elements of the user account module 44, the service attachment module 46, the network attachment module 48 and the video services module 54 as depicted by the overlap between the information source module 210 and those modules. The information source module 210 can include the VOD server 704 and the video filter 708 in the video services module 54.

The marketing information processing module 214 can include, an IP address-based geographic filter 734, an IP access session resolver 736, an audience selection module 738, a user resolver 740 and an opt-out filter 742. The IP address-based geographic filter 734 can receive RI-mytes from the video filter 708 and compare the source IP address contained therein with at least one IP address pattern that can be specific to at least one marketing campaign. Those RI-mytes that match at least one IP address pattern can be retained, while those RI-mytes that do not match at least one IP address pattern can be discarded. The management and configuration of the filters applied by the IP address-based geographic filter 734 can be provided by the marketing information management module 212. The IP address-based geographic filter 734 can send retained RI-mytes to the IP access session resolver 736.

The IP access session resolver 736 can associate each RI-myte with an individual user's IP access session. For each RI-myte received, the IP access session resolver 736 can query the network attachment module 48 to lookup the associated IP access session for the RI-myte. Each query can contain various information including, but not limited to, the source IP address, a timestamp, etc. The network attachment module 48 can process the request and return information that includes, but is not limited to, a unique IP access session ID that is uniquely associated with the user 30, the IP access session IP address, the IP access session start time, unique access circuit information associated with the IP access session, a unique user ID associated with the IP access session, an account ID, etc. The IP access session resolver 736 can avoid querying the network attachment module 48 for each RI-myte received by caching query results locally and searching the local cache first for subsequent RI-mytes, querying the network attachment module 48 if the local cache lacks the information. The network attachment module 48 can notify the IP access session resolver 736 when an IP access session expires so the IP access session resolver 736 can flush its local cache for that IP access session. The IP access session resolver 736 also can avoid querying the network attachment module 48 or can query the network attachment module 48 for more limited information for each RI-myte that already contains sufficient information to identify the user 30, e.g., a device ID or other unique identifier associated with the user 30, before the IP access session resolver 736 receives the RI-myte. The IP access session resolver 736 can associate the information received from the network attachment module 48 with the RI-myte and send the enhanced RI-myte to the user resolver 740.

The user resolver 740 can use the information associated with the RI-myte, e.g., the device ID, the account ID, unique access circuit information associated with the IP access session, a unique user ID associated with the IP access session, etc. to associate the user information with the RI-myte. The user resolver 740 can associate locally cached user information with the RI-myte if, for example, the user resolver 740 had previously processed an RI-myte generated by the same user 30. The user resolver 740 can issue a query to the user account module 44 to retrieve the user information to be associated with the RI-myte. The query to the user account module 44 can include a user ID or other unique user identification information. The query also can specify the information being sought. For example, the query can request the user's postal address and service profile information, e.g. direct mail opt-out preferences. The user resolver 740 can associate the information supplied in response to the query with the RI-myte and send the enhanced RI-myte to the opt-out filter 742.

The opt-out filter 742 can receive RI-mytes from the user resolver 740 and filter the RI-mytes on the basis of opt-out preferences. In other words, the opt-out filter 742 can discard the RI-myte if the service profile information associated with the RI-myte indicates that the user 30 has elected not to participate in the specified type of marketing service, e.g., video services usage-based direct mail. The opt-out filter 742 can send retained RI-mytes to the audience selection module 738.

The audience selection module 738 can receive the RI-myte from the opt-out filter 742 and evaluate it against any other contextual information that the audience selection module 738 can be maintaining for the at least one marketing campaign and user 30 associated with the RI-myte in order to make a decision about whether to include the associated user 30 in the target audience of the at least one marketing campaign. The audience selection module 738 can use the algorithms previously described for this purpose. If the audience selection module 738 decides to add the user 30 associated with the RI-myte to the at least one target audience, the audience selection module 738 can add the user 30 to at least one list of TAMs for the at least one marketing campaign. The audience selection module 738 can send the at least one list of TAMs for the at least one marketing campaign to the distribution channel module 216. The audience selection module 738 can send a complete at least one list of TAMs or can send updates to the at least one list of TAMs as additional TAMs get assigned.

The distribution channel module 216 can use the at least one list of TAMs to send direct mail marketing content to at least one TAM. Sending the direct mail marketing content to the at least one TAM can include, but is not limited to, printing, addressing and sending the physical marketing materials associated with the marketing content through the mail.

Figure 10:
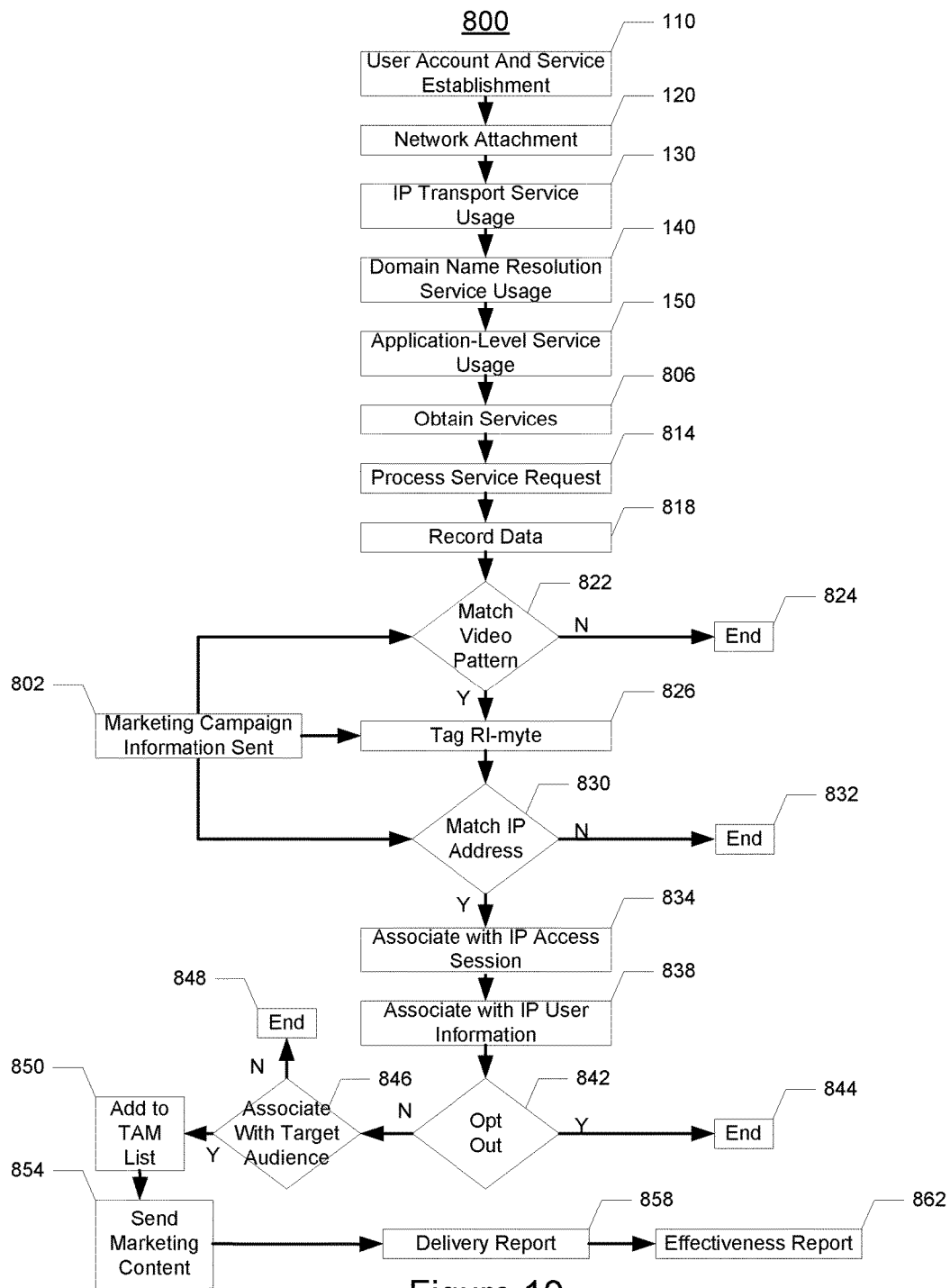
FIG. 10 is a flowchart of a method for providing service provider-based targeted marketing services, according to an exemplary embodiment.

Referring to FIG. 10, a flowchart of a method for sending service provider-based targeted marketing services, according to an exemplary embodiment, is illustrated. FIG. 10 illustrates one example of a method for sending service provider-based TMS and contains the steps that can be used by the service provider 40 to leverage the video services module 54, the user account module 44 and the network attachment module 48 as information sources to gain insight into the user's video services usage activities, obtain addressability information and use that information to send targeted marketing content to the user 30 via a direct mail distribution channel. A method for sending service provider-based TMS can include other steps used to leverage other information sources based on other activities and used to send marketing content to the user 30 via other distribution channels.

In block 802, the marketing information management module 212 can send information associated with at least one marketing campaign to the video filter 708 and the IP address-based geographic filter 734 to manage the information retained and discarded by those filters. The information sent by the marketing information management module 212 can include, but is not limited to, at least one video services request target pattern, at least one source IP address target pattern, a marketing campaign ID, or other use indicator, that can be used by the marketing information processing module 214 to establish processing context and determine proper handling, etc. The information sent by the marketing information management module 212 can be used in blocks 822, 826 and 830.

In block 110, the user 30 can interact with the service provider 40 to sign-up for at least one service and establish a user account. This step can proceed as described for Method 100. For example, the user 30 can arrange for Internet access service and VOD service from the service provider 40. The user 30 and/or the service provider 40 can set up and configure equipment for delivery of the service, e.g., a PC, home router, home network, set-top box, etc. Method 800 then can proceed to block 120.

In block 120, the user 30 can establish a connection to the service provider's infrastructure via an IP-enabled communications link. This step can proceed as described for Method 100. For example, the user's home router can use DHCP to interact with the service provider's edge router and DHCP server to request and receive an IP address along with other host configuration information. This information, in turn, can be used by the user's home router to dynamically configure other IP devices in the home, support NAT services, etc. During this step, the user's IP access session can start, and information about the IP access session can be maintained in the network attachment module 48. The information maintained can include, but is not limited to, the IP address assigned to the user's home router, the access information identifying the user 30, the time that the IP access session began, the user's ID, etc. Method 800 then can proceed to block 130.

In block 130, the user 30 can establish use of IP transport services to communicate with other IP-enabled devices reachable through the service provider's infrastructure. This step can proceed as described for Method 100. Method 800 then can proceed to block 140.

In block 140, the user 30 can establish use of domain name resolution services to access other services. This step can proceed as described for Method 100. For example the user 30 can establish use of domain name resolution services to access websites on the Internet. Method 800 then can proceed to block 150.

In block 150, the user 30 can use application-level services, such as web-browsing, e-mail, file-transfer, voice services, video services, etc. This step can proceed as described for Method 100. For example, the user 30 can request a VOD on a set-top box. Method 800 then can proceed to block 806.

In block 806, the IP packet transport module 42 can route an IP packet sent by the user interface 32 to the appropriate module within the service provider's infrastructure. The appropriate module within the service provider's infrastructure for video services usage, e.g., the VOD request, can be the video services module 54. Method 800 then can proceed to block 810.

In block 814, the VOD server 704 can process the IP packet and act on the IP packet accordingly. For example, the VOD server 704 can identify the VOD content requested by the user 30, retrieve the VOD content from the VOD content database 710 and send the VOD content back to the user interface 32.

In block 818, the VOD server 704 can log the video services usage request and record relevant data. The relevant data can include, but is not limited to, the device ID associated with the IP packet, the source IP address of the IP packet, a timestamp of the time that the packet was received, the video service requested, etc. The collection of data can constitute an RI-myte. Method 800 then can proceed to block 822.

In block 822, the information resource module 105 can perform an initial filtering operation using an element of the video services module 54, the video filter 708, to discard RI-mytes that are irrelevant to Method 800. The video filter 708 can filter the RI-myte based on video services request pattern matching, using the video services request patterns sent by the marketing information management module 212 in block 802. If the RI-myte fails to match at least one video services request pattern, Method 800 can proceed to block 824, where Method 800 can end. If the RI-myte matches at least one video services request pattern, Method 800 can proceed to block 826.

In block 826, the video filter 708 can tag the RI-myte with at least one marketing campaign ID or other use indicator sent by the marketing information management module 212 in block 802. Thus, the information included in the RI-myte being sent for further processing by the video filter 708 can include, but is not limited to, the source device ID of the request, the source IP address of the request, the timestamp of the time that the request was received, the type of RI-myte, e.g., video services usage-based RI-myte, the video services request, associated pattern-matched information, at least one marketing campaign ID or other use indicator to which the RI-myte applies, etc. Method 800 then can proceed to block 830.

In block 830, the IP address-based geographic filter 734 can filter the RI-myte based on IP address pattern matching, using the IP address patterns sent by the marketing information management module 212 in block 802. The IP address patterns against which the RI-myte's source IP address is compared can be marketing campaign specific. For example, the IP address-based geographic filter 734 can check an incoming RI-myte against at least one pattern associated with any of the marketing campaigns to which the RI-myte was associated by the video filter 708. In this way, the IP address-based geographic filter 734 can be applied in a campaign specific manner. If the RI-myte fails to match at least one IP address pattern, Method 800 can proceed to block 832, where Method 800 can end. If the RI-myte matches at least one domain name pattern, Method 800 can proceed to block 834.

In block 834, the IP access session resolver 436 can associate the RI-myte with the user's IP access session. The IP access session resolver 436 can query the network attachment module 48 to lookup the associated IP access session for the RI-myte. The query can contain various information available in the RI-myte, including, but not limited to, the source IP address, a timestamp, etc. The network attachment module 48 can process the request and return information that includes, but is not limited to, a unique IP access session ID that is uniquely associated with the user 30, the IP access session IP address, the IP access session start time, unique access circuit information associated with the IP access session, a unique user ID associated with the IP access session, etc. The IP access session resolver 436 can associate the information received from the network attachment module 48 with the RI-myte and send the enhanced RI-myte to the user resolver 740. At this point, the RI-myte can have been filtered for relevance to at least one marketing campaign, associated with at least one marketing campaign and associated with information from the IP access session that generated the RI-myte. Method 800 then can proceed to block 838.

In block 838, the user resolver 740 can associate the RI-myte with user information. The user resolver 740 can query the user account module 44 to lookup the relevant user information. The query can contain information previously associated with the RI-myte and unique to the user 30, including, but not limited to, a unique account ID, a unique user ID, a device ID, unique access circuit information, etc. The query also can contain an indication of what information the user resolver 740 wants to receive in response to the query. This information can include any information maintained in the user account module 44 including, but not limited to, the user's name, postal address, e-mail address, service profile information, e.g., direct mail opt-out preferences, etc. If the user resolver 740 has previously queried the user account module 44 using the same query information, the user resolver 740 can retrieve the user information from a locally stored cache, rather than query the user account module 44 again. Method 800 then can proceed to block 842.

In block 842, the opt-out filter 742 can filter the RI-myte on the basis of opt-out preferences. The opt-out preferences against which the RI-myte's service profile information is compared can be marketing campaign specific. For example, the distribution channel for one marketing campaign associated with the RI-myte can be direct mail, while the distribution channel for another campaign associated with the RI-myte can be e-mail. The user's service profile information can indicate that the user 30 has selected to opt-out of receiving e-mail-based marketing content but has not selected to opt-out of receiving direct mail-based marketing content. If the user's service profile information indicates that the user 30 has opted-out of all of the marketing service types associated with the RI-myte, Method 800 can proceed to block 844, where Method 800 can end. If the user's service profile information indicates that the user 30 has not opted-out of at least one of the marketing service types associated with the RI-myte, Method 800 can proceed to block 846.

In block 846, the audience selection module 738 can evaluate the RI-myte against any other contextual information that the audience selection module 738 can be maintaining for the at least one marketing campaign and user 30 associated with the RI-myte in order to make a decision about whether to include the associated user 30 in the target audience of at least one marketing campaign. The audience selection module 738 can use the algorithms previously described for this purpose. If the audience selection module 738 does not include the associated user 30 in the target audience of at least one marketing campaign, Method 800 can proceed to block 848, where Method 800 can end. If the audience selection module 738 includes the associated user 30 in the target audience of at least one marketing campaign, Method 800 can proceed to block 850.

In block 850, the audience selection module 738 can add the user 30 and the user's associated information to at least one list of TAMs for at least one marketing campaign and can send the at least one list of TAMs to the distribution channel module 216. For example, the audience selection module 738 can generate, for a marketing campaign that is using direct mail to distribute marketing content, a list of names of users with associated postal addresses and send the list to the distribution channel module 216. The audience selection module 738 can send a complete at least one list of TAMs or can send updates to the at least one list of TAMs as additional TAMs get assigned. Method 800 then can proceed to block 854.

In block 854, the distribution channel module 216 can use the at least one list of TAMs to send direct mail marketing content to at least one TAM. Sending the direct mail marketing content to the at least one TAM can include, but is not limited to, printing, addressing and sending the physical marketing materials associated with the marketing content through the mail. Method 800 then can proceed to block 858.

In block 858, the distribution channel module 216 can inform the audience selection module 738 and the performance analysis module 218, that the marketing content has been sent to the user 30. The audience selection module 738 can use this information to inform subsequent target audience membership decisions. The performance analysis module 218 can use this information to measure the effectiveness of the marketing campaign for which the marketing content was sent. Method 800 then can proceed to block 862.

In block 862, the performance analysis module 218 then can send the effectiveness measurement to the marketing information management module 212. The marketing information management module 212 can use the effectiveness measurement to modify the marketing campaign for which effectiveness was measured. For example, the marketing information management module 212 can adjust the filter information sent to the video filter 708 and/or the IP address-based geographic filter 734 to change the number and/or types of RI-mytes retained by those filters.

The invention claimed is:

1. A system, comprising:
   a user interface module associated with an end user,
      the user interface module being configured to send and receive Internet Protocol (IP) packets using an IP packet transport module, and
      the user interface module being associated with an IP address, a video services user identifier, and a video services device identifier;
   a video services module,
      the video services module including a video-on-demand (VOD) content database and a VOD server, and
      the video services module being configured to provide at least one video service over the IP packet transport module to the user interface module,
         the at least one video service including providing, as a video stream, an item of VOD content from the VOD content database via the VOD server; and
   a targeting module,
      the targeting module including an information source module and an information processing module, and
      the targeting module being configured to:
         receive addressability information from the video services module,
            the addressability information being based on a usage, by the end user, of the at least one video service, and
            the addressability information including the IP address associated with the user interface module, the video services user identifier, and the video services device identifier,
         receive receptiveness information from the video services module,
            the receptiveness information being based on the usage, by the end user, of the at least one video service, and
            the receptiveness information including a timing parameter denoting a point in time of receiving the receptiveness information, and at least one of the IP address of the user interface module and the video services user identifier,
         apply filtering information to the receptiveness information to store filtered receptiveness information,
            the filtering information preventing the inclusion of the receptiveness information in the filtered receptiveness information,
         associate the filtered receptiveness information with the end user using at least one of the IP address associated with the user interface module or the video services user identifier,
         perform an aging operation on the filtered receptiveness information to determine a predictive ability of the filtered receptiveness information,
         modify, over time, a value of the filtered receptiveness information based on performing the aging operation on the filtered receptiveness information,
         determine whether the end user is one of a target audience by using the addressability information and the value of the filtered receptiveness information,
         determine an item of targeted content to provide to the end user,
            the item of the targeted content being selected from a targeted content database based on the target audience, and
         transmit the selected item of the targeted content over the IP packet transport module for storage by the user interface module in a local cache,
            the user interface module being further configured to, during rendering of the VOD content, detect signals embedded in the item of VOD content indicating an insertion opportunity, and upon detection of the signals, insert the targeted content from the local cache into the video stream.

2. The system of claim 1, wherein:
   the video services device identifier comprises at least one of:
      a set-top box identifier (ID),
      a subscriber identity module (SIM) ID, or
      a media access control (MAC) address, and
   the video services user identifier comprises at least one of:
      a user ID, or
      a Session Initiation Protocol-Uniform Resource Identifier.

3. The system of claim 1, wherein the receptiveness information includes information about the video service being requested.

4. The system of claim 1, wherein the filtering information includes:
   a video asset filter pattern identifying one or more video assets, and
   a campaign identifier,
   the filtered receptiveness information being stored to include the campaign identifier.

5. The system of claim 4, wherein the filtering information includes at least one of:
   zip code filters,
   opt-out filters,
   video service type filters, or
   source IP address filters.

6. The system of claim 1, wherein the aging operation includes maintaining the filtered receptiveness information for a fixed window of time.

7. The system of claim 1, wherein the targeting module is further configured to:
 determine whether the end user is one of the target audience by:
  computing a temporally discounted summation of receptiveness information accumulated over time, and
  comparing to a threshold.

8. A method, comprising:
 providing, by a device, at least one video service from a video service module over an Internet Protocol (IP) packet transport module to a user interface module associated with an end user,
  the at least one video service including a video-on-demand (VOD) service that provides, as a video stream, an item of VOD content from a VOD content database;
 receiving, by the device, addressability information from the video services module,
  the addressability information being based on a usage, by the end user, of the at least one video service,
  the addressability information including an IP address associated with the user interface module, a video services user identifier associated with the user interface module, and a video services device identifier associated with the user interface module;
 receiving, by the device, receptiveness information from the video services module,
  the receptiveness information being based on the usage, by the end user, of the at least one video service, and
  the receptiveness information including a timing parameter denoting a point in time of receiving the receptiveness information, and at least one of the IP address associated with the user interface module or the video services user identifier;
 applying, by the device, filtering information to the received receptiveness information to store filtered receptiveness information,
  the filtering information preventing the inclusion of the received receptiveness information in the filtered receptiveness information;
 associating, by the device, the filtered receptiveness information with the end user using at least one of the IP address associated with the user interface module or the video services user identifier;
 performing, by the device, an aging operation on the filtered receptiveness information to determine a predictive ability of the filtered receptiveness information;
 modifying, by the device and over time, a value of the filtered receptiveness information based on performing the aging operation on the filtered receptiveness information,
 determining, by the device, whether the end user is one of a target audience using the value of the filtered receptiveness information and the addressability information;
 determining, by the device, an item of targeted content to provide to the end user,
  the item of the targeted content being selected from a targeted content database based on the target audience;
 transmitting, by the device, the selected item of the targeted content over the IP packet transport module for storage by the user interface module in a local cache of the user interface module;
 detecting, by the device, and during rendering of the item of VOD content, signals embedded in the item of VOD content indicating an insertion opportunity; and
 inserting, by the device; and upon detection of the signals, the targeted content from the local cache into the video stream.

9. The method of claim 8, wherein:
 the video services device identifier comprises at least one of:
  a set-top box identifier (ID),
  a subscriber identity module (SIM) ID, or
  a media access control (MAC) address, and
 the video services user identifier comprises at least one of:
  a user ID, or
  a Session Initiation Protocol-Uniform Resource Identifier.

10. The method of claim 8, wherein the receptiveness information includes information about the video service being requested.

11. The method of claim 8, wherein the filtering information includes:
 a video asset filter pattern identifying one or more video assets, and
 a campaign identifier,
 the filtered receptiveness information being stored to include the campaign identifier.

12. The method of claim 11, wherein the filtering information includes at least one of:
 zip code filters,
 opt-out filters,
 video service type filters, or
 source IP address filters.

13. The method of claim 8, wherein the receptiveness information is provided in a form of an RI-myte.

14. The method of claim 8, wherein the aging operation includes maintaining the filtered receptiveness information for a fixed window of time.

15. The method of claim 8, wherein determining whether the end user is one of the target audience includes:
 computing a temporally discounted summation of receptiveness information accumulated over time, and
 comparing to a threshold.

16. A device, comprising:
 a memory; and
 one or more processors to:
  provide at least one video service from a video service module over an Internet Protocol (IP) packet transport module to a user interface module associated with an end user,
   the at least one video service including a video-on-demand (VOD) service that provides, as a video stream, an item of VOD content from a VOD content database;
  receive addressability information from the video services module,
   the addressability information being based on a usage, by the end user, of the at least one video service, and
   the addressability information including an IP address associated with the user interface module, a video services user identifier associated with the user interface module, and a video services device identifier associated with the user interface module;

receive receptiveness information from the video services module,
- the receptiveness information being based on the usage, by the end user, of the at least one video service, and
- the receptiveness information including a timing parameter denoting a point in time of receiving the receptiveness information, and at least one of the IP address associated with the user interface module or the video services user identifier;

apply filtering information to the received receptiveness information to store filtered receptiveness information,
- the filtering information preventing the inclusion of the received receptiveness information in the filtered receptiveness information;

associate the filtered receptiveness information with the end user using at least one of the IP address associated with the user interface module or the video services user identifier;

perform an aging operation on the filtered receptiveness information to determine a predictive ability of the filtered receptiveness information;

modify, over time, a value of the filtered receptiveness information based on performing the aging operation on the filtered receptiveness information, determine whether the end user is one of a target audience using the value of the filtered receptiveness information and the addressability information;

determine an item of targeted content to provide to the end user,
- the item of the targeted content being selected from a targeted content database based on the target audience;

transmit the selected item of the targeted content over the IP packet transport module for storage by the user interface module in a local cache of the user interface module;

detect, during rendering of the item of VOD content, signals embedded in the item of VOD content indicating an insertion opportunity; and insert, upon detection of the signals, the targeted content from the local cache into the video stream.

17. The device of claim 16, wherein:
the video services device identifier comprises at least one of:
- a set-top box (identifier) ID,
- a SIM (subscriber identity module) ID, or
- a MAC (media access control) address, and the video services user identifier comprises at least one of:
- a user ID, or
- a Session Initiation Protocol-Uniform Resource Identifier.

18. The device of claim 16, wherein the receptiveness information includes information about the video service being requested.

19. The device of claim 16, wherein the filtering information includes:
- a video asset filter pattern identifying one or more video assets, and
- a campaign identifier,
  - the filtered receptiveness information being stored to include the campaign identifier.

20. The device of claim 19, wherein the filtering information includes at least one of:
- zip code filters,
- opt-out filters,
- video service type filters, or
- source IP address filters.

* * * * *